United States Patent

Hayashi

[11] Patent Number: 6,067,555
[45] Date of Patent: *May 23, 2000

[54] DEVICE FOR COLORATION OF BLACK AND WHITE DOCUMENTS

[75] Inventor: Naoki Hayashi, Nakai-machi, Japan

[73] Assignee: Fuji Xerox Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/654,593

[22] Filed: May 29, 1996

[30] Foreign Application Priority Data

Jul. 25, 1995 [JP] Japan ................. 7-208544

[51] Int. Cl.[7] .......................... G06T 11/00
[52] U.S. Cl. ................................ 707/528
[58] Field of Search ............... 395/788–791; 707/526–529

[56] References Cited

U.S. PATENT DOCUMENTS

| | | | |
|---|---|---|---|
| 5,048,109 | 9/1991 | Bloomberg et al. | 382/50 |
| 5,138,465 | 8/1992 | Ng et al. | 358/453 |
| 5,384,863 | 1/1995 | Huttenlocher et al. | 382/9 |

FOREIGN PATENT DOCUMENTS

| | | |
|---|---|---|
| 0 577 048 A1 | 1/1994 | European Pat. Off. . |
| 3-147017 | 6/1991 | Japan . |

OTHER PUBLICATIONS

WordPerfect 6.1 User's Guide p. 449 & Exhib. A–F, 1999.
Patent Abstracts of Japan, vol. 018, No. 567 (P–1820), Oct. 28, 1994 & JP 06 208357 A (Fuji Xerox Co., Ltd.), Jul. 26, 1994, abstract.

*Primary Examiner*—Almis R. Jankus
*Attorney, Agent, or Firm*—Oliff & Berridge PLC

[57] ABSTRACT

A document processor colorizing a black-and-white document by converting a portion of a document which is highlighted with marks, such as underline or hatching, into a highlight expression having color. The document processor inputs document image information, detects a mark from the inputted image information, detects a character string to be subjected to alteration of a visual characteristic thereof from an area covered by the detected mark, determine in what manner the visual characteristic of the character string is to be altered, and generates new image information containing an altered visual characteristic of the character string.

19 Claims, 14 Drawing Sheets

| CONTROL WORD 31 | CHARACTER COLOR 32 | INDEX 33 |
|---|---|---|
| \u1 | \red255\green0\blue0; | 1 |
| \u10 | ; | 0 |
| \shading20 | \red255\green0\blue0; | 1 |
| \bgbdiag | \red0\green255\blue0; | 4 |
| \bgbcross | \red0\green0\blue255; | 4 |
| ..... | ..... | ..... |

FIG.3

| CONTROL WORD | CHARACTER COLOR | INDEX |
|---|---|---|
| \dplinesolid | \red255\green0\blue0; | 1 |
| \dplinedash | \red0\green255\blue0; | 2 |
| \dplinedot | \red0\green0\blue255; | 3 |
| ...... | ...... | ...... |

FIG. 8

DEVICE FOR COLORATION OF BLACK AND WHITE DOCUMENTS

BACKGROUND OF THE INVENTION

1. Field of the Invention

The present invention relates to a document processor and more particularly to a document processor for drawing up a multicolor document having a multicolor image information outputted from, for example, a word processor capable of drawing out a color document, a color copying machine, or a color printer.

2. Description of the Related Art

With the recent spread of color copying machines and computer systems including color scanner and color printers, a system environment which permits end users to easily draw up color documents is being completed. Once it becomes possible to utilize such a system environment, there arises the user's demand for converting black-and-white documents drawn out in the past, black-and-white documents obtained by a facsimile device (FAX), etc. into color documents and thereby obtain documents of a higher appealing effect in a simple manner.

Heretofore, for emphasizing a part of a black-and-white document, there often has been used such a mark as underline or hatching. It is therefore expected that if highlighted portions (marked portions) of a black-and-white document using underlines or hatchings are subjected to color conversion using various colors, the document will become a very conspicuous color document. Thus, in making out a color document, there is a great demand for conversion from black and white to color with respect to highlighted portions of a black-and-white document.

Techniques for such color conversion have heretofore been proposed, for example as disclosed in Japanese Patent Laid Open Nos.222294/87 and 147017/91. The technique disclosed in the former is for coloring underlines in a black-and-white document, while the technique disclosed in the latter is for coloring a hatched area in a black-and-white document and for coloring the hatching itself as well.

According to the above conventional techniques, however, a mark itself which is made specially conspicuous is colored and the mark form is left as it is in the color document after the color conversion. Thus, it is not that the prior art draws up a color document having a highlighted expression form making the most of colored expression. In some case, moreover, the coloration of the marked portion rather makes the highlighted portion difficult to read.

More particularly, in a color document, the change of a character color in a portion to be highlighted is more likely to afford a conspicuous document than coloring only a mark and keeping the character color unchanged. In this connection, if the technique disclosed in the foregoing Japanese Patent Laid Open No.222294/1987 is applied, the character color is unchanged although the underline is colored, and thus the degree of highlight for highlighted expression is low. Also in the case of utilizing the technique disclosed in Japanese Patent Laid Open No.147017/1991, the marked area or the mark itself is colored, but the character color remains the same. With the conventional techniques in question, it is impossible to change the color of characters to be highlighted.

Thus, according to the prior art, the layout corresponding to a black-and-white document which was rendered conspicuous at the time of drawing up the document remains as it is and the mark itself in the marked area is colored, but the character color is unchanged. The color document obtained does not have a sufficiently highlighted expression making the most of coloration.

For example, for making the portion of a highlighted expression conspicuous in a color document, it has experientially been known effective to use a color of high saturation and high density. But according to the method disclosed in Japanese Patent Laid Open No. 147017/1991, if there is used a color of high saturation and high density, the portion of solid paint or hatching rather makes the associated character string difficult to see because the associated character string remains black. Particularly in the case of solid print, it is easier for characters to be seen if they are left white on the solid print base, which however cannot be effected by the method described in the publication in question.

Thus, the conventional techniques involve the problem that since only the mark of a marked portion is colored in the conversion of a black-and-white document to a color document, the marked portion of a highlighted expression sometimes becomes rather difficult to read.

SUMMARY OF THE INVENTION

The present invention has been accomplished for solving the above-mentioned problem and it is the object of the invention to provide a document processor wherein, in the case of converting a black-and-white document to a color document, any portion in the black-and-white document which portion is highlighted using a mark such as underline or hatching can be converted to a highlighted expression making the most of coloration.

In order to achieve the above-mentioned object the document processor of the present invention is provided with an image information input means for inputting image information of a document to be processed, a mark detecting means for detecting a mark from the inputted image information, a character string detecting means for detecting a character string to be changed its visual feature from the area covered by the detected mark, a changing method determining means for determining a method to change the visual feature of the character string, and an image information generating means for generating image information having a changed visual feature of the character string on the basis of the determined changing method.

In the document processor of the present invention, the image information generating means is characterized by generating image information having a changed visual feature of the character string in accordance with the determined changing method and removing the detected mark from the image information. The changing method determining means is characterized by determining a changing method correspondingly to the detected mark. Further, the character string detecting means is characterized by calculating a layout value on the document page of the character string from the image information of the document which has been inputted, then comparing the layout value with the area which the mark covers on the document page, and detecting the character string that is to have its visual feature changed.

As the visual feature of the character string there is used at least either color or shape. In this case, the changing method determining means determines a changing method in accordance with the shape or color of the mark. In another case, it determines a changing method in accordance with the characters or graphic form associated with the mark. The change of the visual feature is conducted for at least the character forming lines or the background area of the characters.

In the document processor of the present invention having such various characteristics as mentioned above, once the image information input means inputs image information of a document to be processed, the mark detecting means detects a mark from the image information, and the character string detecting means detects a character string that is to have its visual feature changed based on the area covered by the detected mark. The changing method determining means determines a method for changing the visual feature of the detected character string, and the image information generating means generates image information having a visual feature of the character string changed by the determined changing method.

The visual feature change in this document processor is performed in the following manner. In accordance with the determined changing method the image information generating means generates image information having a changed visual feature of the character string and removes the detected mark from the image information. The visual feature changing method is determined correspondingly to to the detected mark by the changing method determining means. Further, in the case of detecting a character string to be changed its visual feature, the character string detecting means calculates a layout value on the document page of the character string from the image information of the document which has been inputted, then compares the layout value with the area which the mark covers on the document page, and detects the character string that is to have its visual feature changed.

Here, as the visual feature of the character string there is used at least either color or shape, and the changing method determining means determines a changing method in accordance with the shape or color of the mark. In another mode, the changing method determining means determines a changing method in accordance with the characters or graphic form associated with the mark. Besides, the change of the visual feature is here conducted for at least either the character forming lines or the background area of the characters, whereby the visual feature of the character string can be changed variously.

In this way, according to the document processor of the present invention, once a black-and-white document to be converted to a color document is inputted, the mark detecting means detects a mark for a character string, and the character string detecting means detects the character string (the marked character string) which is distinguished by the mark from the other character strings, on the basis of the inputted image information. Subsequently, for coloring the characters of the character string detected from the document, the changing method determining means determines a visual feature which the marked character string is to be have in the color document after the conversion, and then on the basis of the result of such determination the image information generating means generates image information having the changed visual feature of the marked character string, namely image information of the color document after the conversion.

In this way there is performed a conversion processing for coloration for the marked character string in the black-and-white document, whereby in the color document obtained after the conversion the characters of the character string are colored. Moreover, since the mark is removed, the colored document is easier to see and more conspicuous. Further, by specifying a suitable changing method to change the character shape, the colored document becomes easier to read than in the case of mere coloration of the mark. Consequently, in comparison with the prior art, the highlighted portion in the color document obtained after the conversion for coloration has an expression form more emphasizing the feature of the color document, and thus the color document obtained possesses a higher appealing effect.

Additionally, a suitable changing method for the coloration of a character string is determined in accordance with the color or shape of the mark used, so for example in the case of application to a color copying machine, which portion is to be changed and how it is to be changed can be indicated automatically by merely reading the original for copy even without using an operation panel to designate the color after the conversion separately. Thus, the indication of change by the user can be done easily, and the user can perform the conversion for coloration of a document in a simple manner.

BRIEF DESCRIPTION OF THE DRAWINGS

FIG. 3 is a diagram explaining a data structure of a mark control word•color correspondence table;

FIG. 8 is a diagram explaining a data structure of a mark line type•color correspondence table;

DESCRIPTION OF THE PREFERRED EMBODIMENTS

Figure 1:
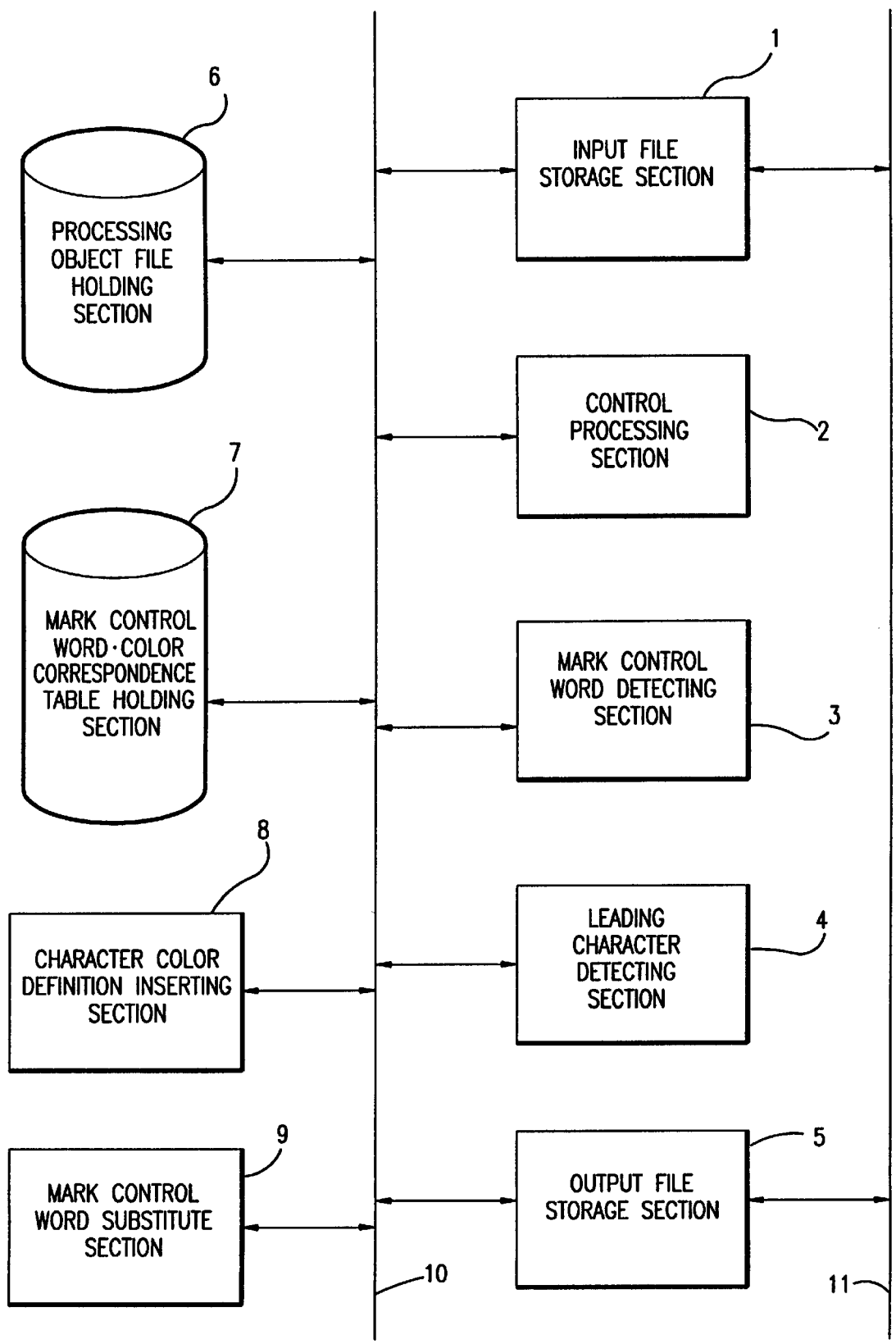
FIG. 1 is a block diagram showing the configuration of a principal portion of a document processor according to the first embodiment of the present invention.

Embodiments of the present invention will be described in detail hereinunder with reference to the accompanying drawings. FIG. 1 is a block diagram showing the configuration of a principal portion of a document processor according to the first embodiment of the present invention. In FIG. 1, the reference numeral 1 denotes an input file storage section, numeral 2 denotes a processing control section, numeral 3 denotes a mark control word detecting section, numeral 4 denotes a leading character detecting section, numeral 5 denotes an output file storage section, 6 a processing object file holding section, 7 a mark control word•color correspondence table holding section, 8 a character color definition inserting section, 9 a mark control word substitute section, 10 an internal bus, and 11 an external network bus.

According to the document processor of the first embodiment, as shown in FIG. 1, the input file storage section 1, processing control section 2, mark control word detecting section 3, leading character detecting section 4, output file storage section 5, processing object file holding section 6, mark control word•color correspondence table holding section 7, character color definition inserting section 8, and mark control word substitute section 9, are connected with one another through the internal bus 10 to constitute a document processing system within one terminal equipment in a network system.

As a concrete operation example of the document processor thus constructed, the following description is now provided about the case where in the document processing system an electronic filing document file containing layout information is read in, a mark such as underline is detected, the marked character string is colored, and a colored electronic filing document file is outputted.

Before explaining an operation example of an electronic filing document file in such a document processing system, an explanation will first be given about the technique serving as a premise. More specifically, reference will first be made to the format of an electronic filing document used herein as well as the color representation and mark representation in the electronic filing document. As the input/output file format in the document processing system of the first embodiment there is used a format which conforms to RTF (Rich Text Format). As an input file of the electronic filing document file there is used a file of black-and-white documents, namely a file wherein is set only the value indicative of "black" as a character color in electronic filing documents.

Description is now directed to the representations of color and mark in the RTF (Rich Text Format) specification used in this document processing system. The RTF file is made up of a header portion and a document portion. In the header portion are described declarations of color, font and layout style. In the document portion there are described text contents, and regarding how to lay out character strings, a description is made using control words defined in the RTF specifications and the declarations described in the header portion.

The colors used in the document file are designated by the declaration of a color table group in the header portion. This declaration is expressed by the following grammar in accordance with the BNF form (Backus form):

<colortbl> '{' \colortbl <colordef>+ '}'
<colordef> \red ? & \green ? & \blue ?';'

The words beginning with the back slash "\" are control words defined by the RTF specification.

More specifically, the control word described as "\ colortbl" represents declaration of the color table, while the control words described as "\ red", "\ green" and "\ blue"

represent color designations of the three primary colors of RGB (red, green and blue), respectively. Integer values which follow these control words ("\red", "\ green", "\ blue") indicate the degrees of the colors, respectively. The color designation range of each of the RGB colors is an integer value range from "0" to "255." In more particular terms, if for example the following control words are described in the color table declaration:

{ \ colortbl \ red0 \ green0 \ blue0; \ red255 \ green0 \ blue0; \ red0 \ green255 \ blue0; \ red255 \ green 255 \ blue 255; }, it is declared in the document file to use the color designation of four colors which are black (\ red0& \ green0& \ blue0; ), red (\ red255& \ green0& \ blue0; ), blue (\ red0& \ green0& \ blue255; ), and white ( \ red255& \ green255& \ blue255; ).

The designation of which color is to be used as the character color from among the colors declared in the color table is performed using, for example, the control word "\ cf" which changes character formatting properties. More specifically, an integer value not smaller than "0" which follows the control word "\cf" serves as an index which designates which color in the color table is to be used. When the value of the index is "N," the (N +1)th color in the color table is the designated color.

The control of color designation is applied to the character strings which follow the control word "\ cf" . This is effective continuously until there appears another designation using the next control word. Among the control words which perform color designation there are included control words "Return to default value" such as "\ pard" and "\ secd".

Therefore, in a document file which contains such color table declaration as mentioned above in its header portion, if, for example, in the document portion of this document file there is such a character string description as ' . . . { \ cf1 The color of this sentence is red.){} \ cf0 The color of this sentence is black.} . . . ', then black is designated first and red second in the color table. Consequently, the character string, "The color of this sentence is red.", in the first half portion of this document text becomes red, while the character string, "The color of this sentence is black.", in the latter half portion which follows the character string of the first half portion becomes black.

Reference will now be made to the mark representation. Underline and hatching, like color designation, are represented by the addition of control words which designate it. That is, underline is represented by control words which change character formatting properties, the control words being a control word indicating the start of the underline and a control word indicating the end of the underline. The control word indicative of the start also indicates the type of the underline. Thus, there are four types of control words indicating the start of underline, which are "\ ul (the ordinary underline)", "\ uld (dotted line)", "\ uldb (double line)", and "\ ulw (draw a line only under characters)". As to the control words indicating the end of under line, there are two types of control words, which are "\ ul0 (the ordinary end of underline)" and "\ ulnone (end of all underlines)". If the following description, ' . . . { \ ul underline \ ul0 is drawn at a portion}', is found in a file document, a single continuous line is drawn under the character string of only the "underline" portion in that description.

Hatchings, each represented as a control word for a paragraph, are broadly classified into two types which are dot type and line type. The RTF specification define (prepare) control words for the addition of those hatchings accordingly, as will be explained below.

A dot type hatching is represented by the control word "\ shading". The dot density is represented by an integer value in the range from "0" to "100" which follow "\ shading". For example, the control word "\ shading20" indicates the addition of hatching with a dot density of 20% to the paragraphs which follow the control word.

As to line type hatchings there are twelve types of control words, including slash and grid. For example, the control word "\ bgbdiag" indicates adding a hatching of a backward diagonal background pattern to the paragraphs which follow the control word. Further, the control word "\ bgdcross" indicates adding the hatching of a diagonal cross background pattern to the paragraphs which follow the control word.

Such hatching designation by a control word is effective for all the paragraphs which follow the control word until designation of another contents is made by designation of another control word. Also in the control words employable in this case there are included control words of "Return to default value" such as "\ pard" and "\ secd".

By such control word designation, with respect to a document file of electronic filing documents for color and mark representation in the RTF specification, there is performed a conversion processing for coloring a black-and-white document with mark representation alone applied to each highlighted portion into a color document, using the electronic filing document file converter as the document processor of the first embodiment.

In connection with the document processing system having the system configuration shown in FIG. 1, description will be directed below to an example of processing with reference to the operation of each system component which processing involves reading an electronic filing document file containing layout information, detecting a control word which designates a mark such as underline, erasing the mark from each marked character string, coloring the characters, and outputting the electronic filing document file as a colored document.

In the document processor (FIG. 1) according to the first embodiment of the present invention, as mentioned previously, the input file storage section 1, processing control section 2, mark control word detecting section 3, leading character detecting section 4, output file storage section 5, processing object file holding section 6, mark control word•color correspondence table holding section 7, character color definition inserting section 8, and mark control word substitute section 9, are connected with one another through the internal bus 7 and constitute one document processing system in a network system. In this document processing system there is performed a conversion processing for converting an electronic filing document file of black-and-white documents into a colored file.

In the conversion processing for the coloration of an electronic filing document file, the processing control section 2, while controlling the other system components, reads an electronic filing document file which contains layout information, detects a control word indicating the addition of a highlight representation mark such as underline in a black-and-white document, then erases the mark itself, colorizes the characters of the marked character string, and outputs a colored electronic filing document file.

Figure 2:
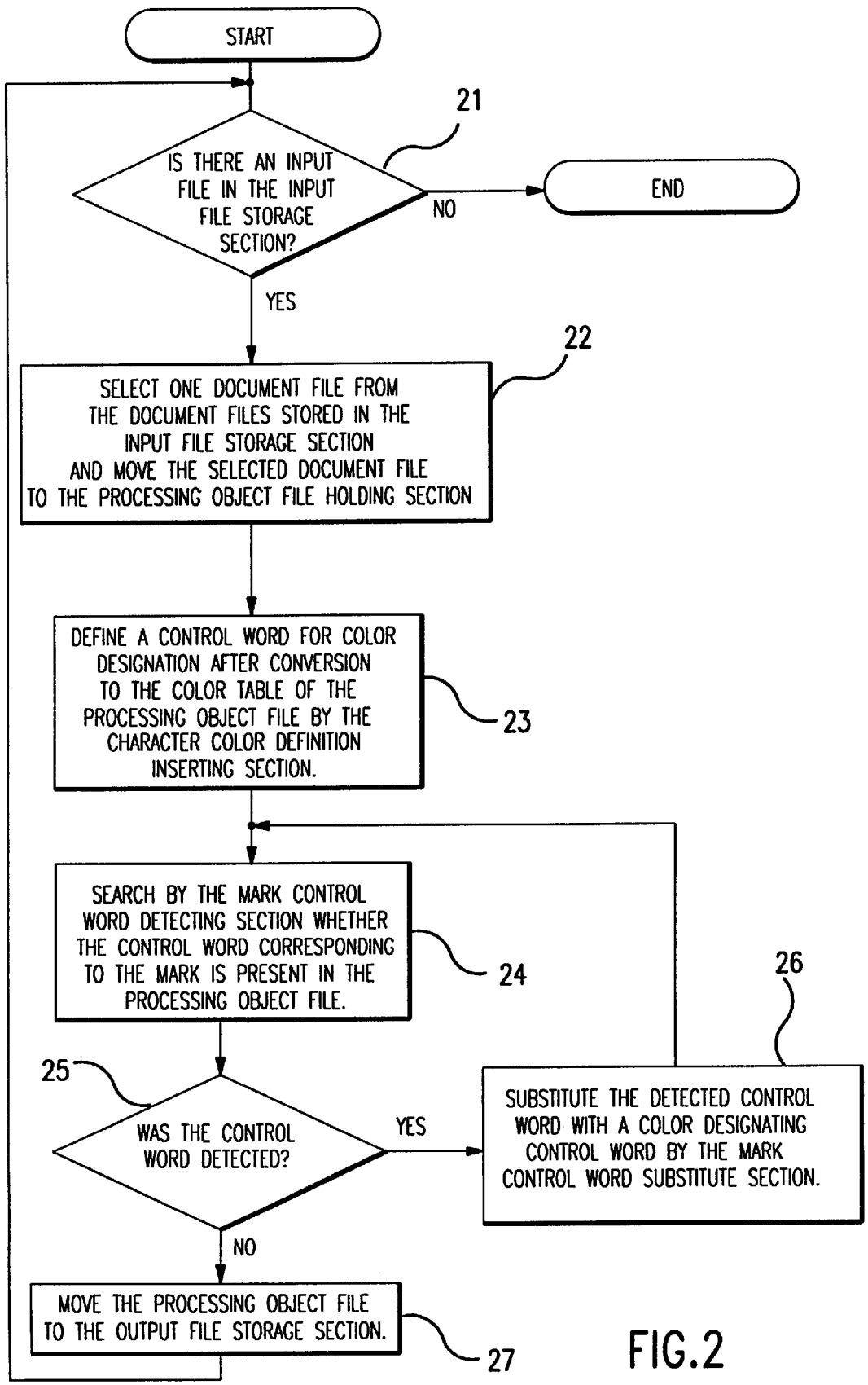
FIG. 2 is a flowchart showing the entire processing flow of a conversion processing for coloration of an electronic filing document file by a processing control section.

FIG. 2 is a flowchart showing the entire processing flow of the conversion processing for the coloration of an electronic filing document file. Referring to FIG. 2, upon start of the processing, first in step 21 the processing control section 2 judges whether a document file is present or not in the input file storage section 1. If the answer is negative, the processing is ended. On the other hand, if the answer is affirmative, the operation flow advances to step 22, in which the processing control section 2 selects one document file stored in the input file storage section 1 and moves the selected document file to the processing object file holding section 6. The document file thus shifted to the processing object file holding section 6 is the processing object file.

Next, in step 23, the processing control section 2 controls the character color definition inserting section 8, which in turn defines a color designation after the color conversion to the color table of the document file (the processing object file) in the processing object file holding section 6. Then, in step 24, the processing control section 2 controls the mark control word detecting section 3 to search whether the control word corresponding to the mark is present or not in the document file of the processing object file. Then in the next step 25 there is made judgment as to whether the control word was detected or not by the search.

If the answer is affirmative in the judgment of step 25, the operation flow advances to the next step 26, in which the mark control word substitute section 9 is controlled to substitute the detected control word with a color designating control word. Then, the operation flow returns to step 24 to continue the processing from same step for the next control word in the document file (the processing object file). That is, the processing involving searching for the next control word and, in the case of the control word being detected, substituting the control word with a color designating control word, is performed repeatedly (steps 24 to 26).

On the other hand, if the answer is negative in the judgment of step 25, it follows that all the processings for the control word have been completed, so in step 27, in order to continue the processing for the next document file, the processing object file is moved to the output file storage section 5 and the document file already processed is stored in the storage section 5. Then, the operation flow returns to step 21 to repeat the processing from the same step.

In this way, while the other system components are controlled by the processing control section 2, an electronic filing document file of black-and-white documents is read, a control word indicating the addition of a highlight representation mark such as underline in a black-and-white document is detected, the mark itself is erased, the marked character string is colored, and a colored electronic filing document file is outputted.

By performing such a processing, for example in the case where, as will be mentioned later, the correlation of mark control word with character color is defined by the data set in a mark control word-character color correspondence table (30, FIG. 3), "an underlined character string is converted to a red character string of red color free of underline, a character string with hatching of 20% density dots is converted to a character string of red color free of hatching, and a character string with hatching of a backward diagonal background pattern is converted to a character string of blue color free of hatching." In this way, marked black-and-white data are converted to color document data.

Reference will now be made to the operation of each system component which is controlled by the processing control section 2. The input file storage section 1 is linked networkwise to another document processing system through the external network bus 11 and receives RTF files transmitted from another document processing system, then stores, say, black-and-white RTF files to be converted to color documents. The input file storage section 1 is utilized for the storage of plural RTF files and for performing the same coloration processing in a lump.

The processing control section 2, which, as mentioned above, is a section for controlling the whole of the conversion processing for coloration, controls the individual system components and at the same time reads in an electronic filing document file containing layout information, detects a highlight mark such as underline, colorize the marked character string, and outputs a colored file.

The processing object file holding section 6 is a system component for holding a document file as a processing object. It holds an RTF file ("processing object file" hereinafter) of a document file for conversion to a color document. Data conversion to a color document is conducted for the processing object file thus held. Therefore, the number of file held in the processing object file holding section 6 is one. The mark control word detecting section 3, character color definition inserting section 8 and mark control word substitute section 9 make access to the document file of the processing object file thus held, perform the data conversion to a color document, and alter the file contents.

The output file storage section 5, which is a system component for storing the RTF file after the coloration conversion, can store document files of plural RTF files. It is linked to another document processing system by wire (the external network bus 11). When another document processing system has accessed the document processing system in question, the stored RTF files (after the coloration conversion) are delivered from the output file storage section 5 to the processing system which has accessed.

In the mark control word•color correspondence table holding section 7 are held tabulated data as a mark control word•color correspondence table (30, FIG. 3) which tabulated data correlate control words indicating the addition of marks in black-and-white documents, RGB values of character colors, and color table indexes of the processing object file, with one another.

FIG. 3 is a diagram explaining the data structure of the mark control word•color correspondence table. As shown in the same figure, the mark control word•color correspondence table 30 comprises a control word field 31, a character color field 32, and an index field 33. As entry data for color designation are stored data which correlate mark control words and character colors with each other. That is, one entry data in the table 30 correlates a control word indicating the addition of one mark with a color designation for character coloration.

In the control word field 31 are stored control words indicating marks for conversion to colors, while in the character color field 32 character colors after coloration conversion of the marks are described as RGB definitions of the color table in correspondence to the marks indicated by the values of "control words" at the same lines (entries) in the control word field 31. The color designation value ";" described in the character color field 32 means the use of default value. Further, in the index field 33 is stored the color table index of the processing object file which index is coincident with the value of "character color" at the same line (entry) as in the character color field 32. Thus, for a control word representing one mark there is made color designation directly using the corresponding value of color designation in the character color field 32, and an indirect color designation is made using the corresponding index value in the index field 33 and by utilizing the color table.

The mark control word•color correspondence table 30 is prepared in accordance with the contents of conversion (color designation) in the case of making data conversion for the coloration of a black-and-white document. Although the control word values in the control word field 31 and the values of color table RGB definitions as character colors in the character color field 32 are fixed, the index values in the index field 33 are changed for each processing object file.

The correlation data using each entry data in the mark control word•color correspondence table 30 which has been set to the above contents are referred to by the character color definition inserting section 8 for setting in the document file the color used in the document after the coloration conversion, and are also referred to by the mark control word detecting section 3 for finding out the control word corresponding to the mark concerned from the document file. The correlation data in question are further referred to by the mark control word substitute section 9 to substitute the control word in the document file with a color designating control word.

In the character color definition inserting section 8 there is performed a processing for setting in the color table of the processing object file the color (character color) to be used in the document after the coloration conversion. Also performed is a processing whereby the associated index in the color table of the processing object file is set in the index field 33 of the mark control word•color correspondence table 30 held by the mark control word•color correspondence table holding section 7.

Figure 4:
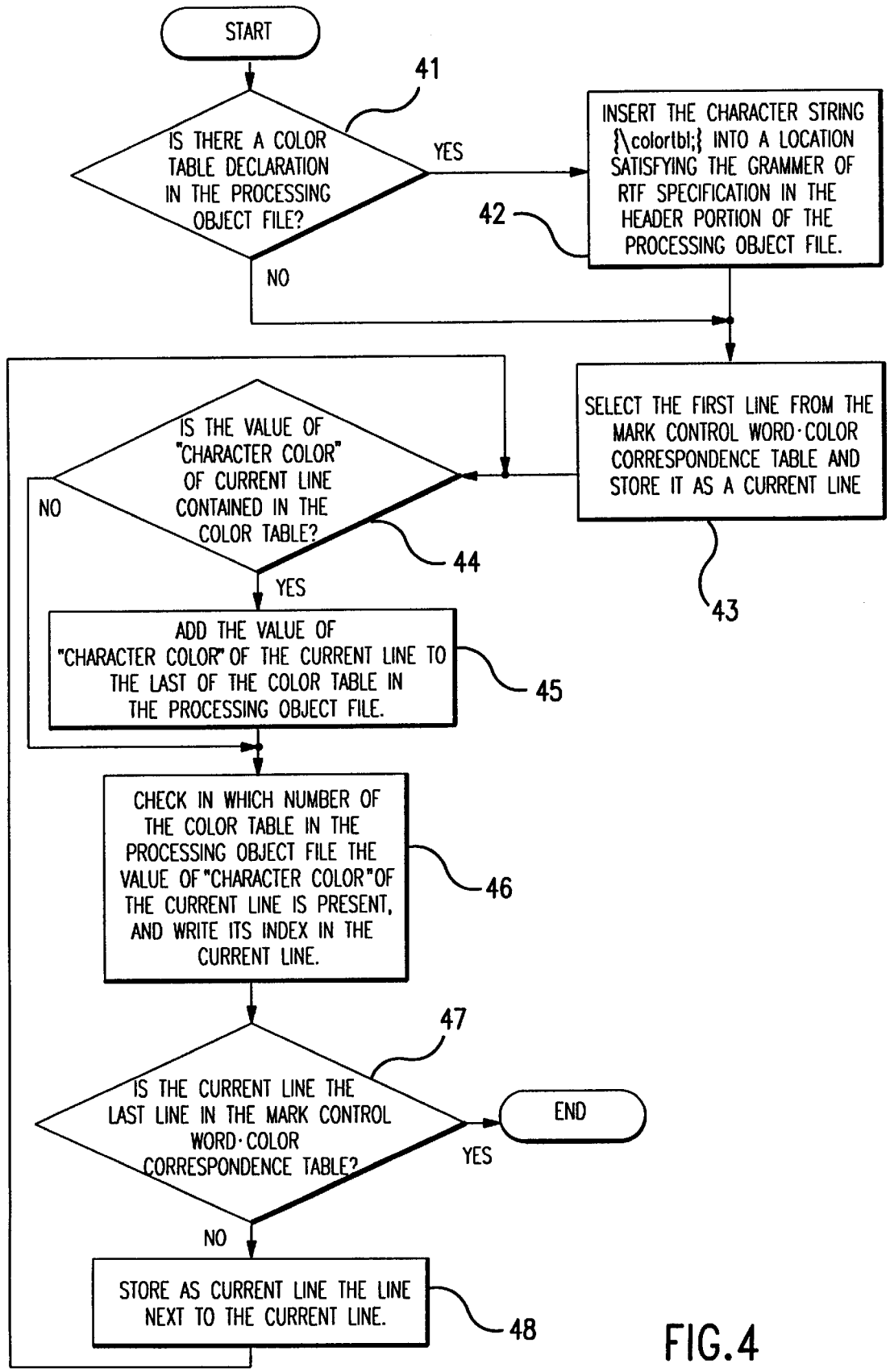
FIG. 4 is a flowchart showing a processing flow in a character color definition inserting section.

FIG. 4 is a flowchart showing a processing flow in the character color definition inserting section. With reference to the flowchart of FIG. 4, description is now directed to the flow of processing made by the character color definition inserting section 8 to set in the color table of the processing object file the color (character color) to be used in the document after the coloration conversion. Once the processing is started, first in step 41 there is made judgment as to whether the color table declaration is present or not in the processing object file. If the color table declaration is not present, the operation flow advances to step 42, in which the character string { \ colortbl; } of the color table declaration is inserted into the header portion of the processing object file at a location which satisfies the grammar of the RTF specification, then the operation flow advances to step 43. On the other hand, if the color table declaration is present, the operation flow advances to the next step 43 without doing anything.

In step 43, the first line (entry) is chosen from the mark control word•color correspondence table 30 held by the mark control word•color correspondence table holding section 7 and is stored as the current line. Next, in step 44, judgment is made to see if the value of "character color" in the character color field of the current line is contained in the color table of the processing object file. If the value of that "character color" is not contained in the color table of the processing object file, then in step 45 the value of "character color" in the character color field 32 of the current line is added to the last of the color table of the processing object file, and the operation flow advances to the next step 46. On the other hand, if the judgment of step 44 shows that the value of "character color" in the character color field 32 of the current line is contained in the color table of the processing object file, the operation flow advances to step 46 directly.

Then, in step 46, a check is made to see in what number of the color table of the processing object file the value of "character color" in the character color field 32 of the current line is present, and the associated index is written in the current line as the value in the index field 33, followed by shift to the next step 47, in which there is made judgment as to whether the current line is the last line (entry) of the mark control word•color correspondence table 30. If the answer is negative, then in step 48 the line next to the current line is stored as a new current line, followed by return to step 44 to repeat the processings from the same step.

On the other hand, if in step 47 the current line is judged to be the last line (entry) of the mark control word•color correspondence table 30, the operation flow is here ended because the character color definitions in the table 30 have been stored in the color table of the processing object file by the processings so far executed.

The mark control word detecting section 3 will now be described. In the mark control word detecting section 3, the control word coincident with the value designated in the control word field 31 of the mark control word•color correspondence able 30 which is held in the mark control word•color correspondence table holding section 7 is searched and detected from the processing object file, then the detected control word and the position thereof in the processing object file are stored. The number of control word detected by a single search is not larger than one. Detection of "0" indicates that the processing object file does not contain the same control word as the value designated in the control word field 31 of the mark control word•color correspondence table 30. Such a mark control word detecting function, as will be described later, is utilized for detecting a character from the processing object file in the processing of the leading character detecting section 4 and is also utilized for replacing mark with color in the processing of the mark control word substitute section 9.

Reference will now be made to the leading character detecting section 4. The leading character detecting section 4 searches the processing object file, detects the first character after a certain control word from the text contents of document in the processing object file, then stores the detected character and the position thereof in the processing object file. As the control word corresponding to the search start point and its position there are used those stored in the mark control word detecting section 3, and processing is started. The function of the leading character detecting section 4 is utilized for substituting mark with color in the processing of the mark control word substitute section 9.

Figure 5:
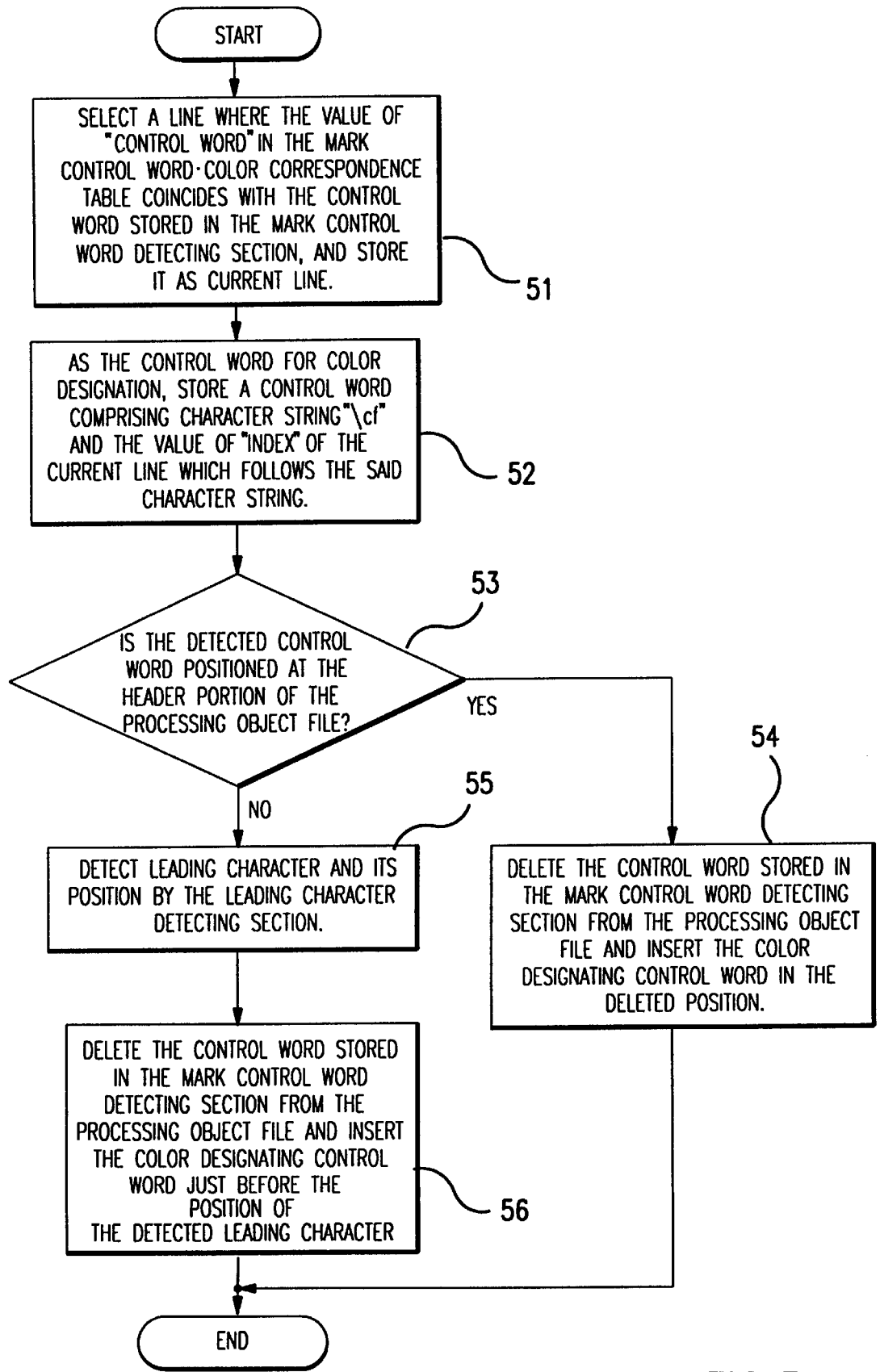
FIG. 5 is a flowchart showing a processing flow in a mark control word substitute section.

The processing executed by the mark control word substitute section 9 will now be described. The mark control word substitute section 9 deletes a control word indicating the addition of a mark from the processing object file and instead inserts a color designating control word into the processing object file. The flowchart of FIG. 5 shows a processing flow in the mark control word substitute section 9. The following description is now provided about the processing in the section 9 with reference to the flowchart of FIG. 5.

Upon start of processing, first in step 51, a search is made for the lines (entries) of the control word field 31 in the mark control word•color correspondence table 30 which is held in the mark control word•color correspondence table holding section 7, then a line wherein the value of the control word coincides with the control word value stored in the mark control word detecting section 3 is selected and is stored as the current line. Next, the operation flow advances to step 52, in which as a color designating control word is stored a control word comprising the character string "\cf" and the index value in the index field 33 of the current line which follows the character string. Then, in step 53 there is made judgment as to whether the control word stored in the mark control word detecting section is positioned in the header portion of the processing object file. If the answer is affirmative, the operation flow shifts to step 54, in which the control word stored in the mark control word detecting section 3 is deleted from the processing object file and the color designating control word (the one prepared in the processing of step 52) is inserted into the deleted position to terminate the processing.

On the other hand, if it is judged in step 53 that the control word stored in the mark control word detecting section 3 is not positioned in the header portion of the processing object file, the leading character detecting section 4 is controlled to detect a character and its position. More specifically, the leading character detecting section 4 searches the processing object file, detects the first character after the control word from the text contents of document in the processing object file, and stores both the detected character and its position in the processing object file. In the next step 56, the detected character and its position are referred to, the control word stored in the mark control word detecting section 3 is deleted from the processing object file, and the color designating control word (the one prepared in the processing of step 52) is inserted just before the position of the character detected by the leading character detecting section 4 to terminate the processing.

In the case where the values in the mark control word-character color correspondence table 30 are set as in FIG. 3, for example, the description ' . . . { \ stylesheet \ bgbdiag; } . . . ' if any in the header portion of the processing object file is substituted by the description ' . . . { \ stylesheet \ cf2; } . . . ' by the processing in the mark control word substitute section 9. And if there is the description ' . . . { \ ul underline \ul0 is drawn at a portion } . . . ' in the document of the processing object file, this description is substituted by the description ' . . . { \ cf1 underline \ cf0 is drawn at a portion} . . . '.

According to the electronic filing document file converter as the document processor of the first embodiment, as set forth above, for example when there is set a correlation of mark control word and character color as in FIG. 3, marked black-and-white data are converted to color document data like the following: "An underlined character string is converted to a red character string free of underline, and a hatched character string with 20% density dots is converted to a red character string free of hatching. Further, a character string hatched with a backward diagonal background pattern is converted to a blue character string free of hatching.

(Second Embodiment—Electronic Filing Document Converter)

An electronic filing document converter will now be described as a document processor according to the second embodiment of the present invention. In the electronic filing document file converter of the first embodiment described above a mark (a control word representing a mark) indicating a highlight portion of a black-and-white document is given as a control word which changes the attributes of a character string or a paragraph, while in connection with the electronic filing document converter of the second embodiment, reference will be made below to the case where the mark for coloration conversion is given as a graphic information.

In the electronic filing document converter of the second embodiment, a mark is a closed curve drawn on a page of a document, and in a file there is utilized one which is described as geometric graphic data or bit map image data. In the electronic filing document converter of the second embodiment, therefore, a page layout is calculated and a comparison is made between the position of a character string and that of a mark to detect a marked character string.

Also in this case, for a thorough understanding, reference will first be made to the representation of geometric graphic data and that of bit map image data both conforming to the RTF specification which serves as a premise in the document processing to be executed here. According to the RTF specification, geometric graphic data are given as drawing objects. More specifically, the description of a certain drawing object conforms to the the following grammar:

'{ \ *' \ do <dohead> <dpinfo> '}'.

In the above grammar, both "<dohead>" and "<dpinfo>" are nonterminals, and in "<dohead>" there is made a description relating to setting an anchor of the drawing object, while in "<dpinfo>" there is made a description relating to the shape of the drawing object. Further, for the description of shape such as line type or a solid print pattern there are used control words defined by the RTF specification.

The bit map image data according to the RTF specification are given as pictures and are expressed by a description beginning with the control word "\pict". In this description, after arrangement of control words which represent information necessary for the interpretation of bit data such as the definition of bit map plane and the designation of image size, there are arranged bit data of hexadecimal or binary digit representation.

For an electronic filing document of such geometric graphic data or bit map image data as expressed by the RTF specification, a coloration conversion processing is performed using marks which are given as graphic information by means of the electronic filing document converter of the second embodiment.

Figure 6:
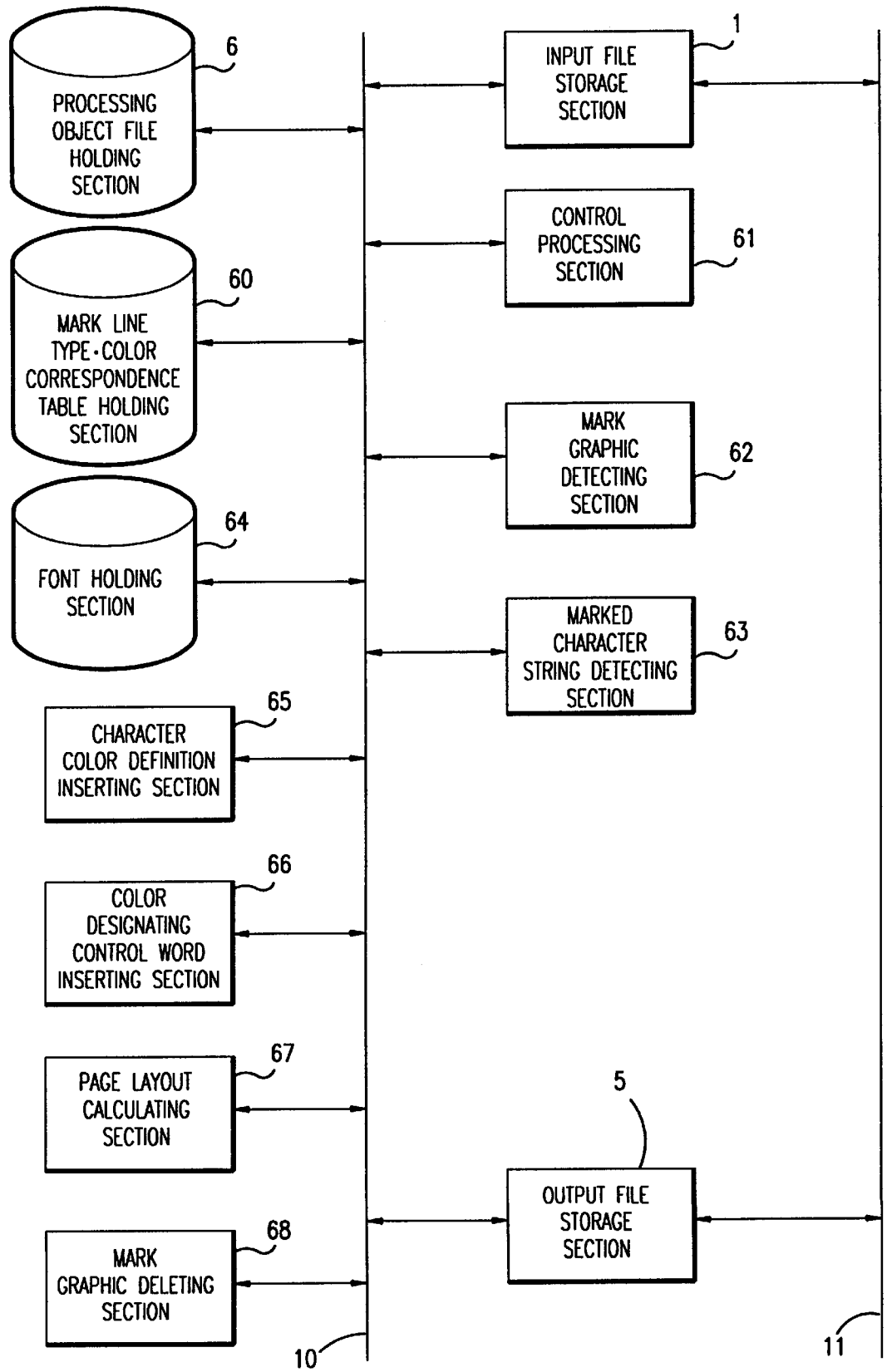
FIG. 6 is a block diagram showing system components which constitute an electronic filing document converter in a document processor according to the second embodiment of the present invention.

FIG. 6 is a block diagram showing system components which constitute the electronic filing document converter as the document processor of the second embodiment. In the same figure, the reference numeral 1 denotes an input file storage section, numeral 5 denotes an output file storage section, 6 a processing object file holding section, 10 an internal bus, 11 an external network bus, 60 a mark control word•color correspondence table holding section, 61 a processing control section, 62 a mark graphic detecting section, 63 a marked character detecting section, 64 a font holding section, 65 a character color definition inserting section, 66 a color designating control word inserting section, 67 a page layout calculating section, and 68 a mark graphic deleting section.

In the document processor of the second embodiment the same system components as in the document processor of the first embodiment are indicated by the same reference numerals as in the first embodiment. More particularly, the input file storage section 1, output file storage section 5, processing object file holding section 6, internal bus 10 and external network 11 are the same as in the document processor of the first embodiment.

As shown in FIG. 6, also in the document processor of the second embodiment, like the document processor of the first embodiment, the input file storage section 1, output file storage section 5, processing object file holding section 6, mark line type•color correspondence table holding section 60, processing control section 61, mark graphic detecting section 62, marked character string detecting section 63, font holding section 64, character color definition inserting section 65, color designating control word inserting section 66, page layout calculating section 67 and mark graphic deleting section 68 are connected with one another through the internal bus 10, thereby constituting a document processing system in one terminal equipment of a network system. At the input file storage section 1 and output file storage section 5 this document processing system is connected through the external network 11 to an external document processing system connected to the network system.

In the document processor of the second embodiment there is performed a coloration conversion processing for an electronic filing document using a mark of graphic information. Also in this case, the processing control section 61, while controlling the other system components, reads in the file of the electronic filing document containing the graphic information as mark, then colorizes the characters of a character string specified by using as mark a closed curve drawn on a page or geometric graphic data or bit map image data, then erases the mark itself, and outputs the thus converted file as a colored electronic filing document. For example, there is performed a coloration processing for an electronic filing document in such a manner that a character string enclosed by a bit map image is converted to a red character string, a character string enclosed by a broken line is converted to a green character string, and a character string enclosed by a dotted line is converted to a blue character string.

Figure 7:
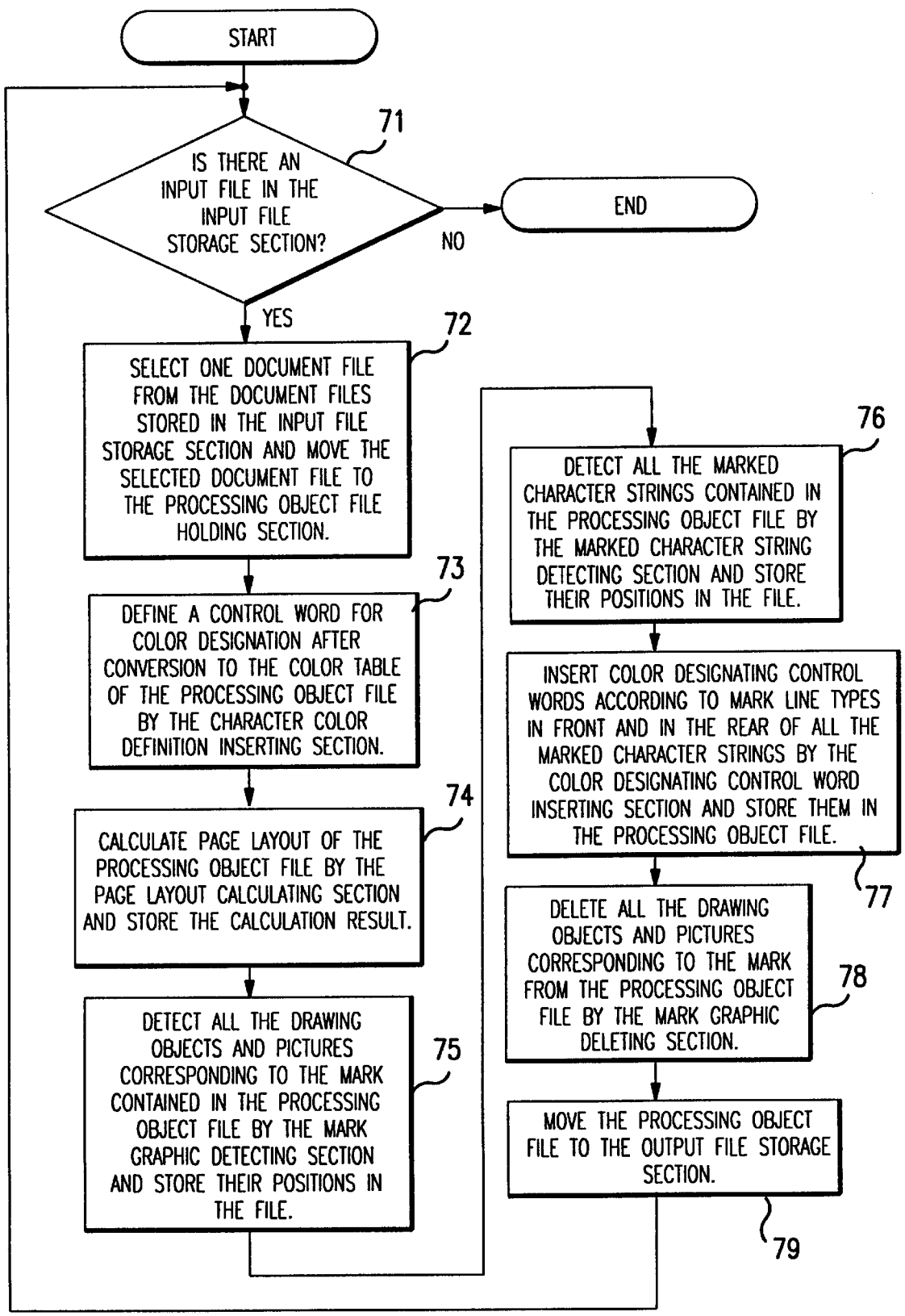
FIG. 7 is a flowchart showing the entire processing flow of a conversion processing for coloration of an electronic filing document by a processing control section in the second embodiment.

FIG. 7 is a flowchart showing the entire processing flow of the conversion processing for coloration of an electronic filing document by the processing control section in the second embodiment. The processing flow will now be described with reference to the flowchart of FIG. 7. Upon start of processing, first in step 71, the processing control section 61 judges whether document files are present in the input file storage section 1. If the answer is negative, the processing is ended. On the other hand, if files are present in the input file storage section 1, the operation flow advances to step 72, in which the processing control section 61 selects one document file from the input file storage section 1 and moves the selected document file to the processing object file holding section 6. The document file thus shifted to the processing object file holding section 6 is used as a processing object file.

Next, in step 73, the character color definition inserting section 65 is controlled to define a color designation after coloration conversion to the color table of the document file (the processing object file) in the processing object file holding section 6. Then, in step 74, the page layout calculating section 67 is controlled to calculate the page layout of the processing object file, followed by holding of the calculation result. In the next step 75, the mark graphic detecting section 62 is controlled to detect all the drawing objects and pictures corresponding to the marks contained in the processing object file, and their positions in the file are stored.

Then, in step 76, the marked character string detecting section 63 is controlled to detect all the marked character strings contained in the processing object file, and their positions in the file are stored. Next, in step 77, the color designating control word inserting section 66 is controlled to insert color designating control words according to mark line types before and after all the marked character strings and store them in the processing object file.

Further, in step 78, the mark graphic deleting section 68 is controlled to delete from the processing object file all the drawing objects and pictures corresponding to the marks. Now the processing for the electronic filing document is over. In step 79, in order to continue the processing for the next document file, the processing object file is moved to the output file storage section 5 and the document file which has been processed is stored in the same storage section. Then, the operation flow returns to step 71 to repeat the processing.

In this way the processing control section 2, while controlling the other system components, reads in an electronic filing document file of black-and-white documents containing layout information, detects a control word indicating the addition of a highlight representation mark in each black-and-white document such as underline, then erases the mark itself, colorizes the marked character string, and outputs the thus-colored electronic filing document file.

In the case where a correlation of line types of graphic information used as marks with character colors is defined by the data set in a mark line type•color correspondence table (80, FIG. 8) which is held in the mark line type•color correspondence table holding section 60, there is conducted a coloration conversion processing through such a series of operations as performed above by the processing control section, in the following manner: "A character string enclosed by a bit map image is converted to a red character string, a character string enclosed by a graphic form of broken line is converted to a green character string, and a character string enclosed by a graphic form of dotted line is converted to a blue character string." In this way black-and-white document data with graphic information as marks are converted to color document data.

FIG. 8 is a diagram explaining the data structure of the mark line type•color correspondence able. As shown in the same figure, the mark line type•color correspondence table 80 comprises a control word field 81, a character color field 82 and an index field 83. As entry data for color designation are stored data which correlate control words for graphic information as marks with character colors. That is, the entry data in the mark line type•color correspondence table 80 correlate control words for graphic information as marks with color designations for the coloration of characters.

In the control word field 81 are stored control words which represent marks for conversion to colors. Here are stored control words for designating the line type, or style, of drawing objects. In the character color field 82, like the mark control word•color correspondence table 30 in the first embodiment described above, character colors after coloration conversion are described as RGB definitions of the color table in correspondence to the marks indicated by the values of "control words" at the same lines (entries) in the control word field 81. In the index field 83 are stored the color table indexes of the processing object file coincident with the values of "character colors" at the respective lines (entries) in the character color field 82. Thus, for a control word representing graphic information as mark, (e.g. \ dplinesolid, \ dplinedash, \ dplinedot), there is made color designation directly using the corresponding value of color designation in the character color field 82, and an indirect color designation is made using the corresponding index value in the index field 83 and by utilizing the color table.

The mark line type•color correspondence table 80 is prepared in accordance with the contents of conversion (color designation) in the case of making data conversion for the coloration of a document character string using graphic information as marks. Although the control word values in the control word field 81 and the values of color table RGB definitions as character colors in the character color field 82 are fixed, the index values in the index field 83 are changed for each processing object file.

The correlation data using each entry data in the mark line type•color correspondence table 80 which has been set to the above contents are referred to by the character color definition inserting section 65 for setting in the document file the color used in the document after the coloration conversion and are also referred to by the mark graphic detecting section 62 for finding out the control word corresponding to the mark concerned from the document file. The correlation data in question are further referred to by the color designating control word inserting section 66 to insert a color designating control word into the character string specified by the mark in the document file.

In the character color definition inserting section 65 there is conducted a processing for setting in the color table of the processing object file the color (character color) to be used in the document after the coloration conversion. There also is performed a processing whereby the associated index in the color table of the processing object file is set in the index field 83 of the mark line type•color correspondence table 80 held by the mark line type•color correspondence table holding section 60. Since the processing in the character color definition inserting section 65 is the same as the processing illustrated in FIG. 4, explanation thereof is here omitted, provided as the RGB values defined here there are used values found in the table 80 held by the table holding section 60.

The font holding section 64 holds a character font capable of being designated by a font table group at the header portion of the processing object file. The page layout calculating section 67 utilizes the character font information held in the font holding section 64 for the purpose of making a rough page layout calculation. Likewise, for detecting a character string enclosed with a graphic information mark, the marked character string detecting section 63 refers to the character font information held in the font holding section 64.

The page layout calculating section 67 calculates areas occupied on a page by paragraph, drawing object and picture in the processing object file and stores the results of the calculation as data arranged in a coordinate system for each page, in which coordinate system the left upper corner point of each page is the origin, the upper end of the page is x axis and the left end of the page is y axis. As the unit in the coordinate system there is adopted "twip" which is used as a unit indicative of length on the page layout. In terms of "point" which is a unit often used in printing, one twip corresponds to 0.05 point.

The area of paragraph is given as a minimum rectangular area capable of including all the text contents when the text contents are laid out on a page. This area calculation utilizes information relating to the size of the character font held in the font holding section 64. The result of this area calculation is stored as rectangular data on the coordinates. At the same time, the position in the processing object file where the description of the paragraph is started is stored in correlation with the rectangular data.

The area of drawing object is given as a minimum rectangular area capable of including the graphic form concerned. The result of this area calculation is stored as rectangular data on the coordinates. At the same time, the position in the processing object file where the description of the drawing object is started, namely the position of the control word "\do" in the file, is stored in correlation with the rectangular data.

The area of picture is given as a minimum rectangular area capable of including the bit map image concerned. The result of this area calculation is stored as rectangular data on the coordinates. At the same time, the position in the processing object file where the description of the picture is started, namely the position of the control word "\pict" in the file, is stored in correlation with the rectangular data.

Figure 9:
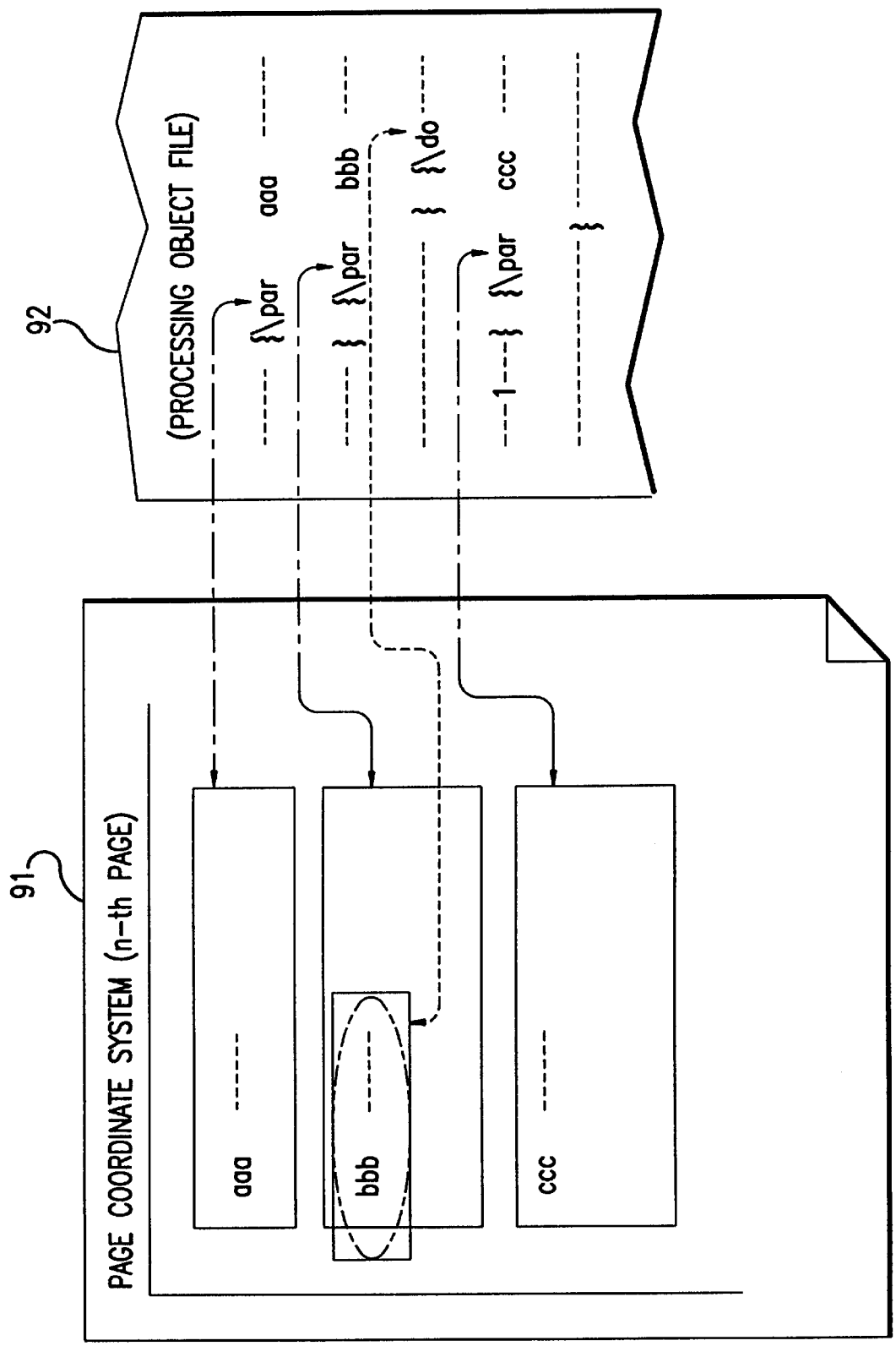
FIG. 9 is a diagram explaining the relation between document data in a file to be processed and the area which the document data occupies on page.

The page layout calculating section 67 holds the results of the layout calculations. Positional relations between such document data in the processing object file and data in the page coordinate system are shown in FIG. 9. FIG. 9 is a diagram explaining the relation between document data in the processing object file and areas which the document data occupy on a page. For example, as shown in FIG. 9, the description of a character string corresponding to the area of paragraph is started by the control word "\par", so the paragraph area calculated by the page layout calculation and the start point of description starting with the control word "\par" are stored in correlation with each other. Also, the other rectangular areas calculated by the layout calculation and the control words as description start points corresponding to those areas are stored in correlation with each ot her.

The following description is now provided about the processing function of the mark graphic detecting section 62. The mark graphic detecting section 62 searches for a processing object file and detects drawing objects and pictures corresponding to marks. As to the drawing object or picture corresponding to mark for specifying a character string to be colored, its area on a page overlaps the area of paragraph, the mark graphic detecting section 62 searches for such drawing object or picture by utilizing the page layout calculating section 67.

More specifically, drawing objects and pictures corresponding to marks are detected by performing a series of the following processing steps 1 to 3 for all of the descriptions of drawing objects and pictures in each processing object file.

Processing Step 1:
Search for one description starting with the control word "\do" or "\pict" in a processing object file.

Processing Step 2:
Find out area data correlated with the storage of the page layout calculating section, from the description start position in the processing object file found out in the processing step 1.

Processing Step 3:
Check to see if the area data found out in the processing step 2 overlap the laid-out area of paragraph on page coordinates, and if the answer is affirmative, it is judged that the description found out in the processing step 1 is a drawing object or picture corresponding to mark.

Once the drawing object or picture is thus detected in the mark graphic detecting section 62, the description start position in the processing object file of the detected drawing object or picture and the description start position of paragraph in the file which overlaps it are stored in correlation with each other.

The marked character string detecting section 63 performs a processing for detecting a character string in paragraph marked with the drawing object or picture. More specifically, for each of the description start positions stored in the mark graphic detecting section, the marked character string detecting section 63 performs a series of the following processing steps 1 to 4 to detect a character string in paragraph marked with the drawing object or picture.

Processing Step 1:
Search for area data of the paragraph by utilizing the page layout calculating section 67, from the description start position of the paragraph stored in the mark graphic detecting section 62.

Processing Step 2:
Calculate the position on the page coordinate system of each character in the paragraph by utilizing both the area data found out above and the character font information held in the front holding section, and store the result of the calculation.

Processing Step 3:
From the description start position of the drawing object or picture stored in the mark graphic detecting section 62 and correlated with the description start position in the processing step 1, find out area data of the drawing object or picture by utilizing the page layout calculating section 67.

Processing Step 4:
Compare the calculation result in the processing step 2 with the area data found out in the processing step 3, locate the first character and the last character both included in the area data, and store their positions in the processing object file in correlation with the description start position in the processing step 3.

In this way the marked character string detecting section 63 detects the character string in the paragraph marked with the drawing object or picture. Next, for the detected character string, the color designating control word inserting section 66 performs a processing for the insertion of color designating control words.

In the color designating control word inserting section 6, control words for changing the color of the marked character string are inserted into the processing object file correspondingly to the position of the character string. More specifically, control words for color designation are inserted respectively just before and just after the first and last characters which are marked and stored in the marked character string detecting section 63. As in the first embodiment, the value of the control word inserted just before the position of the first character is determined using the mark line type•color correspondence table 80 held in the mark line type•color correspondence table holding section 60. Which line (entry data) of the table 80 is to be used is determined by the description of the drawing object or picture associated with the first character position. In the case of drawing object there is used a line at which the line type designating control word contained in the description concerned is coincident with the value the item "control word" in the correspondence table. In the case of picture, there is no control word that controls the line type, so it is assumed that the control word "\dplinesolid" is defined, and processing is made in the same way as in the case of drawing object. The value of the control word inserted just after the position of the last character is "\cf0" which indicates return of the color designation to default.

After the color designating control words have been inserted as above by the color designating control word inserting section 66, the mark graphic deleting section 68 performs a processing for deleting the graphic information which has been utilized as mark. The mark graphic deleting section 68 refers to the mark line type•color correspondence table held in the mark line type•color correspondence table holding section 60 and deletes an arbitrary description of drawing object or picture from the processing object file.

Thus, according to the electronic filing document converter of the second embodiment comprising such various system components as described above, for example in the case where, as shown in FIG. 8, the character color value 'Red: "\red255 \ green0 \ blue0"' is set for the control word "\dplinesolid", the character value 'Green: "\red0 \ green255 \ blue0"' is set for the control word "\dplinedash", and the character color value 'Blue: "\red0 \ green0 \ blue255"' is set for the control word "\dplinedot", there is made a coloration conversion in such a manner that a character string enclosed with a bit map image is colored red, a character string enclosed with a graphic form of broken line is colored green, and a character string enclosed with a graphic form of dotted line is colored blue.

Thus, according to the electronic filing document converter of the second embodiment of the invention, such a graphic information as drawing object or picture is utilized for the coloration conversion of characters of a character string, while according to the electronic filing document file converter of the first embodiment of the invention described previously, such a mark control word as underline or hatching is utilized (as mark) for the coloration conversion of characters of a character string. These coloration conversion methods are each independent. By combining the methods of the first and second embodiments it is made possible to effect the coloration conversion of electronic filing documents in still more various modes.

More particularly, the first and second embodiments can be carried out even if the entire system and the system components are modified as follows. For example, by combining the electronic filing document file converter of the first embodiment with the electronic filing document converter of the second embodiment, it becomes possible to cope with both marks using text attributes and marks based on picture drawing, and these marks permit characters of a character string to be colored.

The input file storage section 1 may be endowed with a format conversion function for the conversion from an arbitrary file format to RTF format, whereby it becomes possible to perform the coloration conversion processing for a document file of an arbitrary file format. Likewise, the output file storage section 5 may be endowed with a format conversion function for the conversion from the RTF format to an arbitrary file format having a color describing capability, whereby a document file which has undergone the coloration conversion processing can be outputted in an arbitrary file format. Further, the format conversion function may be endowed with a function which permits the user to select a desired file format, whereby it becomes possible to receive the output in a file format which the user desires.

The tables held respectively by the mark control word•color correspondence table holding section 7 and the mark line type•color correspondence table holding section 64 may be rendered modifiable on the user side, whereby it becomes possible to set the mark•color correlation to a desired one by the user. Further, as to whether the alteration of such correlation is to be temporary or permanent, an inquiry may be made of the user and thereafter the alteration may be set in accordance with instructions given by the user. By so doing, the period effective for alteration of the correlation can be set so as to meet the user's request.

In the case of altering the mark•color correlation according to the user's desire, there may be adopted a GUI (Graphical User Interface) technique of indicating examples of marks and colors and making selection from among them, in addition to the configuration which permits direct input of the values of various data shown in the mark control word•color correspondence table and the mark line type•color correspondence table. By adopting the technique it is possible to diminish the burden on the user's input operation. As to alteration of the correspondence tables, it is optional whether the tables are to be replaced or partially updated.

Further, an item field for the catalog of control words relating to the character shape (available values are those of control words relating to the character shape of character format characteristics, e.g. "\i", "\outl") may be added to the correspondence table held by the mark control word•color correspondence table holding section 7 or the mark line type•color correspondence holding section 64, and in the case of writing color designating control words for the characters of a character string into the processing object file, the associated values in the item field are written subsequent to the color designating control words. By so doing it becomes possible to alter the color and character shape of a marked character string at a time. For example, it becomes possible to "change underlined characters into red contour characters" and hence possible to use still more various expressions in a simple manner. It also becomes possible to alter the shape of the character background area, that is, modifications can be made so as to permit hatching or netting.

Thus, in altering the character shape or the shape of the character background area, the contents of the character color designating control words may remain substantially unchanged. More specifically, in the case of making coloration conversion involving conversion of mark control words for the characters of a character string, there is made a modification wherein the conversion of character shape control words is made in place of the conversion of color designating control words. This is advantageous in that the user can obtain a desired conspicuous document less expensively when the effect of discrimination is ensured even without the change of color.

Although in the first and second embodiments there are used lines and hatchings, including the type thereof, as marks for specifying the characters of a character string in the coloration conversion, there may be used any other marks if only the marks used permit visual specifying of the covered area, such as parentheses, brackets, and solid print.

Although in the first and second embodiments a visual characteristic of a character string is altered according to the shape of mark, a modification may be made so as to alter the contents of visual characteristic in accordance with the color of mark. In this case, the mark control word detecting section or the mark graphic detecting section detects a specific color as mark, and the contents of alteration are decided from the detected mark color in accordance with the mark control word•color correspondence table or the mark line type•color correspondence table. Also in this case, information which correlates the mark shape and color to be detected with the character string altering method is held by the former or the latter table just referred to above, and there may be adopted a configuration wherein the contents of the color designating control words for the characters of the specified character string are altered accordingly.

Further, although in the first and second embodiments a visual characteristic of a character string is altered according to the shape of mark, a modification may be made so as to alter the visual characteristic using characters or graphics located near the mark. For example, in the electronic filing document file converter of the first embodiment, a control word for superscript or subscript present just before or just after the control word corresponding to mark is searched and if it is found out, then a visual characteristic of the marked character string is altered accordingly.

For example, according to the RTF specification, the character string ' . . . The sales of company A are by far the most important. . . . ' is described as ' . . . {The sales of company A are \ ul by far the most \ ul0 \ sub important \ nosupersub.} . . . '. In this description, the control word "\sub" indicates the start of subscript, while the control word "\nosupersub" indicates the end of superscript or subscript. Also in this case, therefore, a search is conducted for a control word and there is made a control word substitute for alteration of its visual characteristic. More specifically, using a search control word-substitute control word correspondence table, there is held each information piece which correlates the control word corresponding to the mark to be detected and the contents of superscript or subscript with the character string altering method, and the control word conversion processing for the character string concerned is performed accordingly.

Where this processing is applied in the second embodiment, information pieces each correlating the shape of mark to be detected and characters or graphics present near the mark with the alteration method for the character string concerned are held according to the file format of processing data in the mark line type•color correspondence table, and the data conversion processing is executed in accordance with those information pieces.

That is, after detection of the mark concerned, the mark graphic detecting section 62 searches for picture elements present near the mark to recognize characters or a graphic form, then on the basis of both the result of this recognition and the correlation information in the mark line type•color correspondence table the color designating control word inserting section 66 inserts control words into the processing object file concerned. The mark graphic deleting section 68 changes the color of the mark graphic and characters or graphics located thereabouts into white color at a time. Through such a series of operations there is made a change in visual characteristic of the character string concerned. In the electronic filing document converter of the second embodiment, like the electronic filing document file converter of the first embodiment, RTF is used as the file format of processing data, but there may be any other file format if only it has a describing capability equal to or even higher than that of RTF with respect to color and mark. Further, although in both converters there is used a table form as the data structure in the mark line type•color correspondence table, it should be clear that any other data structure may be used if only it permits a color description with control words as keys. Thus, modifications may be made for various formats and data structures.

(Third Embodiment—Copying Machine with Edit Function)

Description is now directed to a copying machine with edit function as a document processor according to the third embodiment of the present invention. In the electronic filing document converter of the second embodiment described above, graphic information pieces were used as marks for the coloration conversion; for example, closed curves drawn on document pages, as well as those described as geometric graphic data or bit map image data in files, were utilized as marks, and a marked character string was detected by calculating a page layout and comparing the character string position with the position of mark. On the other hand, in the copying machine with edit function of this third embodiment, a marked character string is detected by an image data processing and there is performed coloration conversion for the characters of the character string in an original document.

More specifically, the copying machine with edit function of the third embodiment is configured in such a manner that a black-and-white original marked with a color marker pen is read in, then the mark is detected, and a color original having colored characters of the marked character string is outputted. Further, the change in color of the characters of a character string after coloration conversion is made according to the color of the color marker pen.

In the copying machine with edit function of the third embodiment, as will be later described in more detail, first the user is required to mark (for example with line or parentheses) each portion to be colored of a black-and-white original, or paint the whole of such portion, using a color marker pen, to provide indication of mark. As to the color marker pen, there are provided color marker pens of different colors such as "for heading" or "for highlight" according to uses. The user marks a portion to be colored of a black-and-white original by means of a marker pen of a color which suits the purpose of use. When the user puts the thus-marked black-and-white original on an original reading section of the copying machine with edit function and pushes a start button to instruct a processing control section to start copying. As a result, the original is outputted in a color-converted state of the marked portion into the desired color.

Figure 10:
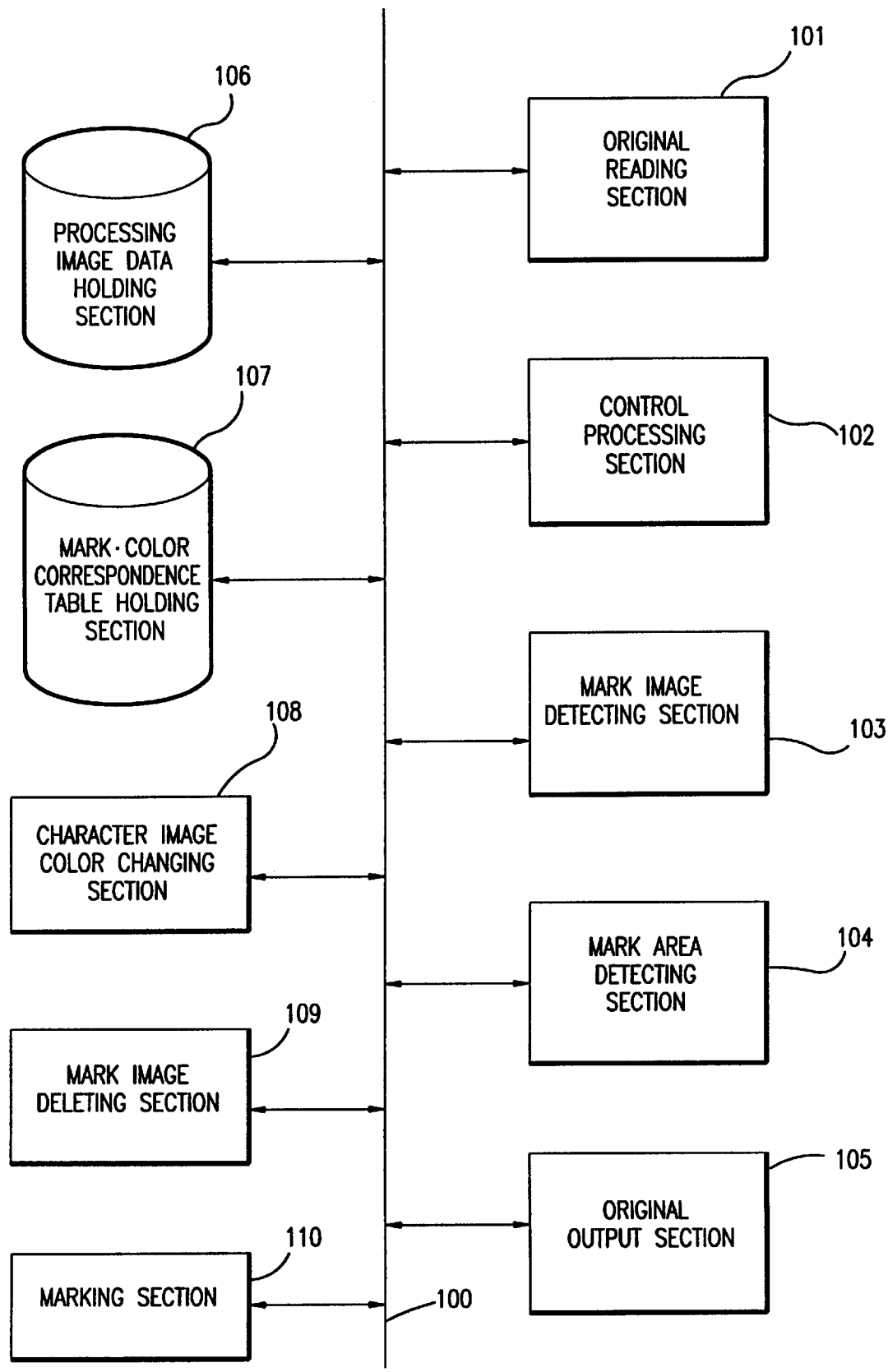
FIG. 10 is a block diagram showing system components which constitute a copying machine with edit function as a document processor according to the third embodiment of the present invention.

FIG. 10 is a block diagram showing system components which constitute the copying machine with edit function as the document processor of the third embodiment. In the same figure, the reference numeral 100 denotes an internal bus, numeral 101 denotes an original reading section, numeral 102 denotes a processing control section, 103 a mark graphic detecting section, 104 a mark area detecting section, 105 an original output section, 106 a processing image data holding section, 107 a mark•color correspondence table holding section, 108 a character image color changing section, 109 a mark image deleting section, and 110 a marking section.

The copying machine with edit function of the third embodiment is provided with system components which are processing components for image data (pixel data) and which are of similar functions as the image data processing system components of the document processor of the second embodiment. More specifically, in the system configuration of the copying machine with edit function according to the third embodiment, the original reading section 101, processing control section 102, mark image detecting section 103, mark area detecting section 104, original output section 105, processing image data holding section 106, mark•color correspondence table holding section 107, character image color changing section 108, mark image deleting section 109, and marking section 110 are connected with one another through the internal bus 100 to constitute a single copying machine with edit function as a document processing system.

In the copying machine with edit function of the third embodiment, the mark of a color marker pen attached to a black-and-white original document is detected and there is performed a conversion processing for coloration of the original document. Also in this case, the processing control section 102, while controlling the other system components, reads the black-and-white original marked with the color marker pen, discriminates the character string specified with the mark, then colorize the character string, erases the mark itself, and outputs the colored original document.

Figure 11:
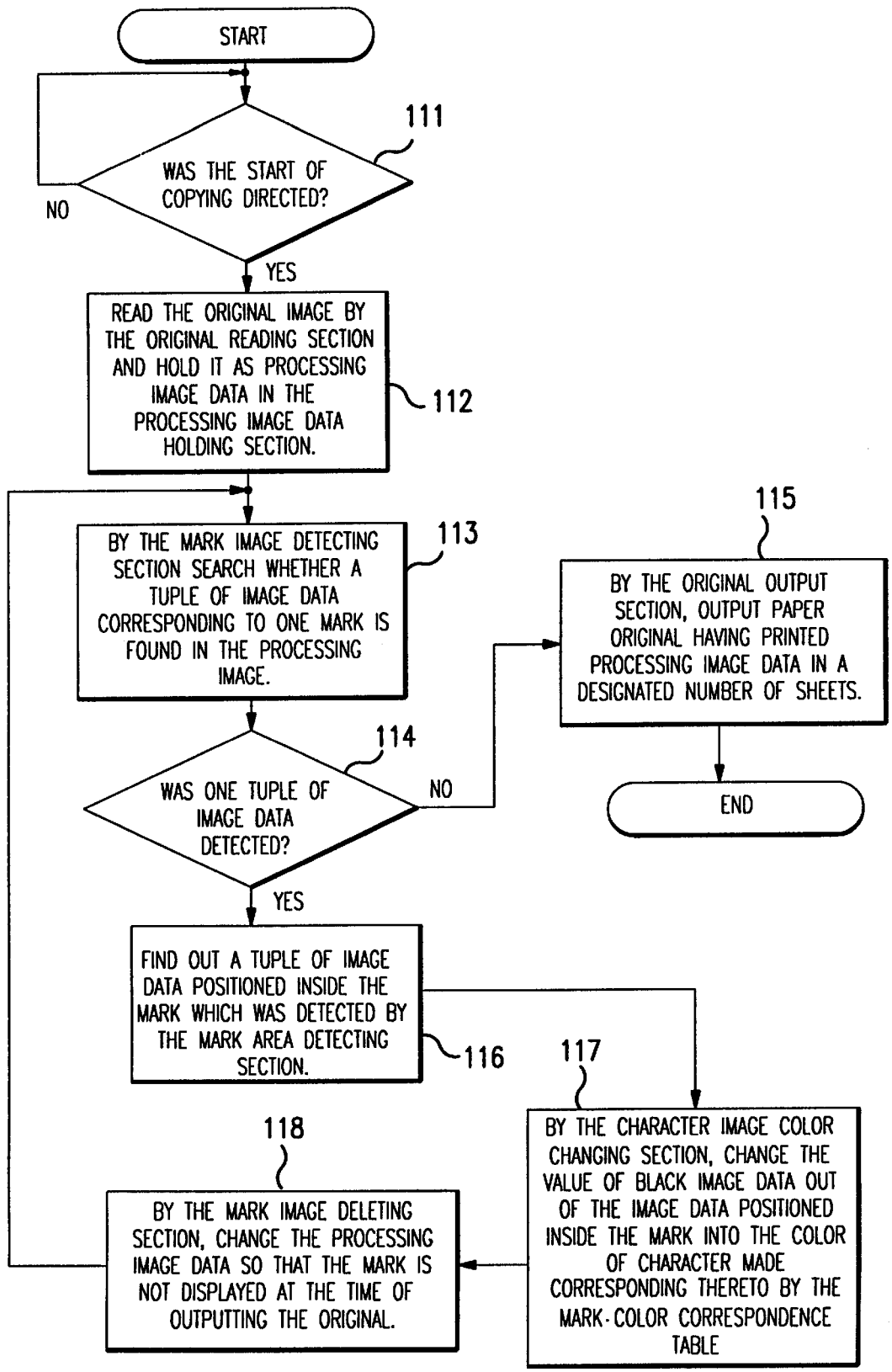
FIG. 11 is a flowchart showing the entire processing flow of a conversion processing for coloration of an original document by a processing control section in the third embodiment.

FIG. 11 is a flowchart showing the entire processing flow of the coloration conversion processing for an original document executed by the processing control section in the third embodiment. The coloration conversion processing will now be described with reference to the flowchart of FIG. 11. Once the processing control section 102 starts the processing, first in step 111, judgment is made repeatedly as to whether the start of copying has been instructed or not. If the answer is affirmative, the operation flow advances to step 112, in which the original reading section reads the original image and holds it as processing image data in the processing image data holding section 106.

Next, in step 113, the processing control section 102 controls the mark image detecting section 103 to check whether all pixel data tuples corresponding to one mark are present in the processing image of the processing image data. Then, in step 114 there is made judgment as to whether one pixel data tuple was detected or not as a result of the above search. If the answer is affirmative, the operation flow advances to step 116, in which the processing control section 102 controls the mark area detecting section 104 to find out a pixel data tuple positioned inside the detected mark. Next, in step 117, the character image color changing section 108 is controlled to change the value of black data in the image data positioned inside the mark into the corresponding character color in accordance with a mark•color correspondence table. More specifically, the value of black data in the image data positioned inside the mark is changed to the value of the character color associated with the marker pen color of that mark in accordance with the mark•color correspondence table.

Next, in step 118, the mark image detecting section 109 is controlled to alter the processing image so that the mark image is not displayed at the time of output of the original. According to this processing, the color designated of the mark image is changed to the same color as the background image color. Then, to make processing for the next pixel data tuple, the operation flow returns to step 113 and the operations starting with step 113 are repeated.

On the other hand, if it is judged in step 114 that a pixel data tuple corresponding to one mark has not been detected, it follows that the processing for the pixel data of the original document is over. In this case, the operation flow shifts to step 115, in which the original output section 105 is controlled to output a designated number of copies of the original with the processing image data printed thereon.

In this way, the processing control section 102, while controlling the other system components, reads an original image from a black-and-white document, detects characters (pixel data) of a character string marked with a color marker pen, then colorizes the characters (pixel data), erases the mark itself, and outputs the colored image of the original document after printing.

Figure 12:
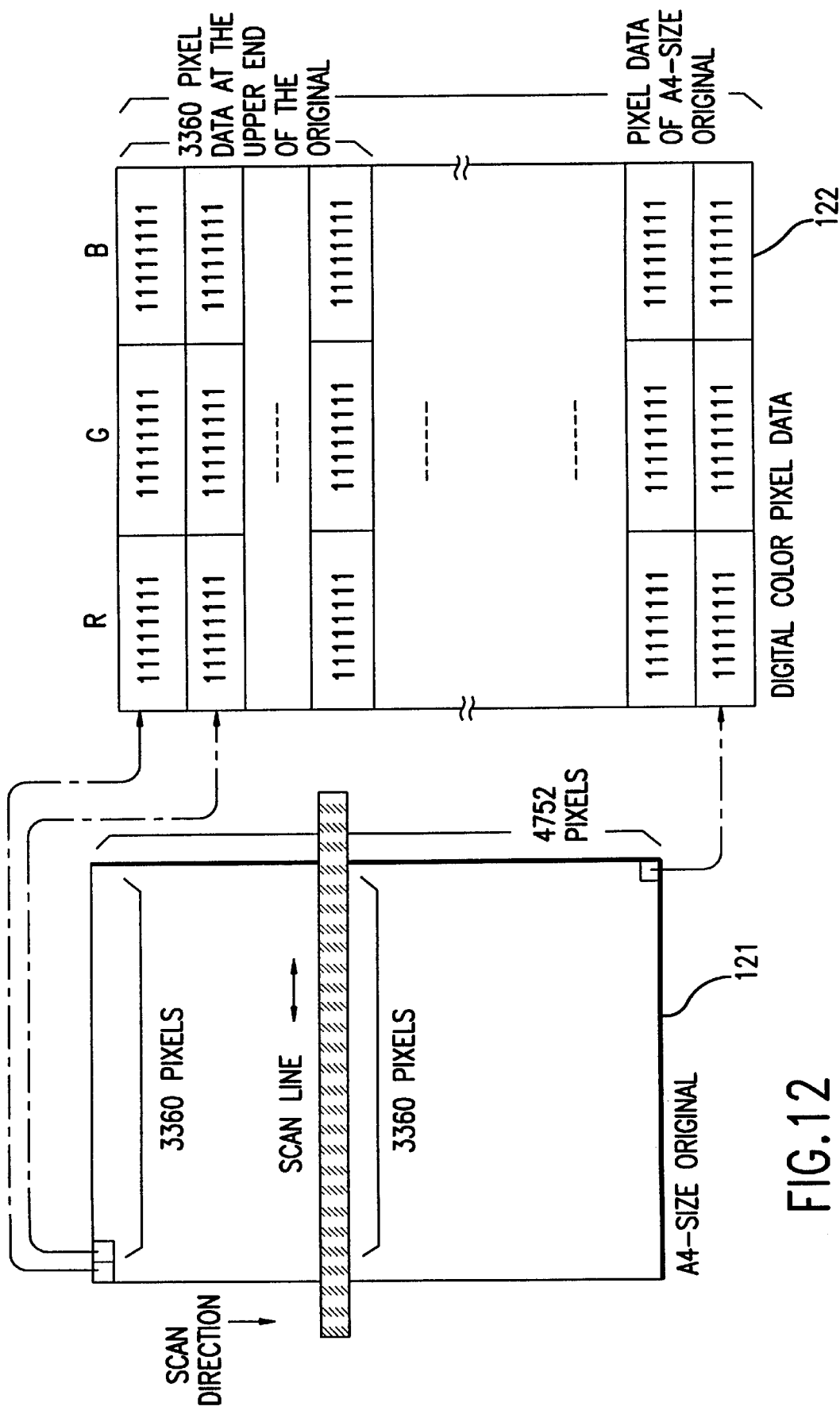
FIG. 12 is a diagram explaining the structure of image data which are read by an original reading section.

FIG. 12 is a diagram explaining the structure of image data read by the original reading section 102. As shown in the same figure, the original reading section 102 scans a black-and-white original 121 as a processing object optically, makes resolution into the three primary colors of light R (red), G (green) and B (blue), then produces digital color image data 122 of 256 gradation (8 bits) using those colors respectively, and causes the digital color image data to be held in the processing image data holding section 106. One picture element the digital color image data thus produced corresponds to 0.0625 mm square (16×16 picture elements per mm$^2$, resolution: about 400 dpi) on the original. One pixel data is represented by 24 bits (continuous 3-byte data). That is, the first 8 bis of 24 bits represent 256 gradation data of R (red), the middle 8 bits represent 256 gradation data of G (green), and the last 8 bits represent 256 gradation data of B (blue). The state of white is when all the bits are on, while the state of black is when all the bits are off.

Digital color image data obtained by a single scan correspond to one A4-size sheet of the original and are represented by (3360×4752) pieces of continuous pixel data, assuming that the lateral direction is the horizontal scanning direction (3360 pixels) and the longitudinal direction is the vertical scanning direction (4752 pixels). The order of pixel data is determined uniquely from the left top position on the original of the pixel data. This data sequence is in conformity with an optical scan such that a scan line (realized by CCD) along the short side direction of the original is shifted in the long side direction. When an A4-size original is placed so that its length is in the vertical direction, the pixel data from the head to the 3360th pixel are the top pixels arranged successively from the left to the right. In this way, 4752 tuples of pixel data are arranged successively from the top to the bottom, with 3360 pixel data as one tuple.

The processing image data holding section 106 holds the digital color image data (processing image data) as the processing object which have been read by the original reading section 101. In this case, the processing image data on one sheet of an A4-size original have a size of (3360× 4752)×24 bits, corresponding to a data volume of about 46 Mbytes.

The mark•color correspondence table holding section 107 holds a mark•color correspondence table. Though not shown, the mark•color correspondence table represents tabulated conversion data similar to the foregoing mark control word•color correspondence table (FIG. 3), which data correlate the colors of marker pens ("marker color" hereinafter) with character colors used in outputted originals. The color values in the mark•color correspondence table are represented in the same form as the pixel data. The marker colors are subjected beforehand to colorimetry and then converted to the form of pixel data, which are defined in the mark-color correspondence table. In connection with the marker colors, the range of values detected and falling under an allowable range is also defined in the same correspondence table. The mark image detecting section 103 refers to the range of value detected as mark and falling under the allowable range in the correspondence table and detects image data (pixel data) corresponding to the mark. Further, the character image color changing section 108 refers to the value of character color in the correspondence table which color is used in the outputted original, and alters the color of pixel data corresponding to the marked characters.

From the processing image data the mark image detecting section 103 detects the marker color attached to the black-and-white original document, further detects one tuple of pixel data corresponding to the mark and stores the pixel data tuple. The tuple of pixel data corresponding to the mark indicates a pixel data group continuous on the original and having the same marker color (including an allowable value). The detected pixel data tuple is stored as a set (hereinafter referred to as "mark pixel set") with pixel data addresses as elements. According to this address storing mechanism, the pixel data tuple is stored while controlling the addition of elements so as to avoid overlapping of the set elements, that is, in such a manner that all the addresses as elements are different from one another.

The processing of the pixel data storing mechanism is performed in accordance with the algorithm of the following processing steps 1 to 6, which algorithm is a recursive algorithm.

Processing Step 1:

If there are elements in the stored mark pixel set, delete all of them (initialization).

Processing Step 2:

From the pixel-data in the processing image data, select one which is coincident with any of the marker colors in the mark•color correspondence table and store the address of the selected pixel data as the current address.

Processing Step 3:

Store as object color the marker color of the pixel data indicated by the current address and color falling under the allowable range thereof.

Processing Step 4;

Add the current address to the mark pixel set.

Processing Step 5:

Search for pixel data positioned above, below and right, left on the original with respect to the pixel data indicated by the current address, and if among them there are any pixel data whose values coincide with the object color and whose addresses are not found in the mark pixel set, store their addresses.

Processing Step 6:

Using the pixel data addresses stored in the processing step 5 successively as current addresses, execute the processing steps 4 to 6 until there is no longer any object address.

Such a processing function of the mark image detecting section 103 is utilized by the mark area detecting section 104 for detecting picture elements located inside a mark and is also utilized by the character image color changing section 108 to check the marker color of a mark. It is further utilized by the mark image deleting section 109 to alter the color of image data corresponding to a mark.

Figure 13:
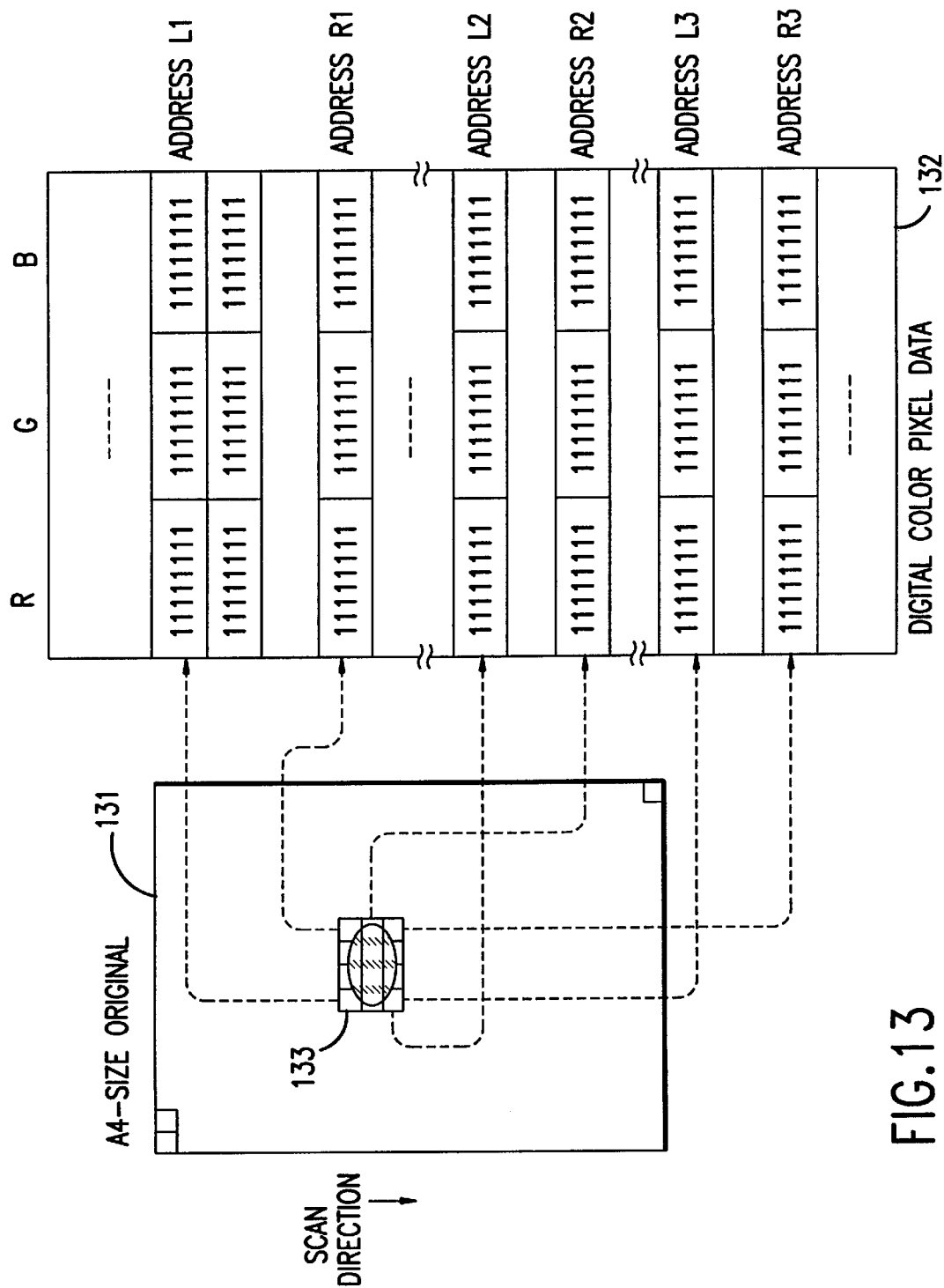
FIG. 13 is a diagram explaining an address tuple of pixel data detected as a mark area by a mark area detecting section.

FIG. 13 is a diagram explaining an address pair of pixel data detected as mark area by the mark area detecting section 104. The mark area detecting section 104 detects two picture elements present inside the pixel data of mark detected by the mark image detecting section 103 and stores the addresses thereof. Thus, the addresses of pixel data detected as mark area and stored by the mark area detecting section 104 indicate an address range of the pixel data as mark area. More specifically, as shown in FIG. 13, in association with a mark image 132 of image data on an original 131 there is detected a pair indicating an address start point (address L) and an address end point (address R) of digital color image data 132 at every scanning line, and a set including that pair as elements is stored. The address pair (address L, address R) of each pixel data is in correspondence to a portion the associated scanning line (a portion of 3360 picture elements arranged in the short side direction of the original).

An example of algorithm of the processing carried out by the mark area detecting section 104 will now be described. For example, the address (address L) of the picture element located in the left most position and the address (address R) of the picture element located in the rightmost position in each scanning line are searched from among the addresses included in the mark pixel set stored in the mark image detecting section 103, and both addresses thus found out are paired at every scanning line, then a set including such pairs as elements is stored. In this way there is detected a mark area at every scanning line.

After the detection of mark area has been made in the above manner, if the value of pixel data present in the address range of mark area stored in the mark area detecting section 104 indicates black color(all the 24 bits are off), the character image color changing section 108 makes change into the associated character color in accordance with the mark•color correspondence table. Thus, as the value after the coloration conversion, the object color of mark detected and stored as a mark pixel set by the mark image detecting section 103 is changed into the associated character color in accordance with the correspondence table.

After the coloration conversion for the pixel data concerned is over, the mark image deleting section 109 deletes the image corresponding to the mark from the processing object image so that the mark attached to the black-and-white original may not appear in the resulting color document. In this case there is performed a processing for changing the values of all the pixel data which the mark pixel set stored in the mark image detecting section 103 indicates into white color (all the 24 bits are on), whereby there are obtained processing image data capable of being printed and outputted. Next, the processing image data are sent to the original output section 105, which in turn outputs the thus-colored original after printing.

Using a printing mechanism of a digital color xerography type, the original output section 105 makes exposure with a laser beam and subsequent development, and print the color image on paper. To this end, the original output section 105 converts the processing image data after the coloration conversion represented by RGB into the data of Y (yellow), M (magenta), C (cyan) and K (black) correspondingly to the toner colors of color-printed copies. Since the color copying machine of this third embodiment requires a development cycle for each of the toner colors YMCK, there are used data corresponding to the associated toner color at every development cycle. Under control made by the processing control section 102 the original output section 105 copies the colored original in a number of sheets designated by the user concerned.

The marking section 110 has a marking function for specifying a portion to be subjected to the coloration conversion on the black-and-white original which is read by the original reading section. In the case where such a processing function is to be performed in an electronic manner, for example a black-and-white original is displayed on a display screen and then marked with a light pen or stylus pen of a pointing device for specifying a portion to be subjected to the coloration conversion. Such a pointer cursor as a mouse is also employable for this purpose. The portion for the coloration conversion of the black-and-white original may be marked directly with a color marker pen without making such electronic marking. In this case, the color of the color marker pen is cataloged in the system (the mark•color correspondence table) beforehand.

More particularly, plural color marker pens of different colors are provided, and for the coloration conversion, the colors of the color marker pens and the colors for the coloration conversion are correlated with each other according to purposes of use, like "for heading" and "for highlight." For example, the color marker pens are used like the user "encircles a portion to be highlighted on the original by the use of a marker pen for highlight."

Though not referred to in the above description, the processing control section 102 is further endowed with a function to control the entire control processing for the whole of the copying machine with edit function. The control section 102 receives instructions from the user with respect to the number of copies to be outputted and the start of copying, and executes the entire processing related to the color copying function accordingly. To this end the processing control section 102 has a user interface processing function through buttons or a touch panel.

The following description is now provided about modification examples of various system components of the copying machine with edit function according to the third embodiment. In the first example of modification, the mark image detecting section 103 is endowed with a function of recognizing symbols/numerals/characters which are written with a marker pen in the vicinity of mark, and the contents of the mark•color correspondence table held in the mark•color correspondence table holding section 107 are modified so as to set correlations between the recognized symbols/numerals/characters and the coloration colors for black-and-white originals. This modification permits the use of a single-color marker pen for marking without the need of using marker pens of plural colors.

According to the first modification example referred to above, the mark image deleting section 109 is endowed with a function for deleting the recognized images of symbols/numerals/characters, whereby it becomes possible to change the color of the marked character string according to the contents of write near the mark. For example, if symbols such as ⊚○▲▼■, or numerals, or characters such as "important" or "highlight," are written near a mark which has been affixed to a to-be-colored portion of a black-and-white document with a marker pen, it is possible to obtained a colored original having colored characters of the marked portion.

According to the second example of modification, the color correlation in the mark•color correspondence table held by the mark•color correlation table 107 is altered into the correlation of marker color and character color and background color, and the character image color changing section 108 makes change into the value of background color with respect to all the pixel data present in the mark pixel address range except black color, and the system component of the mark image deleting section is removed. By such a series of modifications the color of the marked character string is changed and at the same time there is outputted a colored original in which the marked area is colored. Since the character color and the background color change at a time, it is possible to make a proper use of color. Besides, since the effect of handwriting with a marker pen is given to the character background portion, it becomes easier for the user to get a document having a higher appealing effect.

According to the third example of modification, in the case of changing the character background color in the above second example of modification, the hatching pattern is also changed in addition to the change of color. More specifically, in the correlation of colors defined in the mark•color correspondence table held by the mark•color correspondence table holding section 107, a master pattern of the background color area is stored and the color of the character background area is altered partially on the basis of the master pattern. As the master pattern there may be used, for example, lines such as \\\\, /////, ||||, or ≡, or a combination of such lines, or circular or square dots. The color of the background area may remain the same because in some case it is possible to make distinction of character strings even without altering the color of the background area. Further, as to the contents (character strings) of the original document, a modification is made in the original output section 105 so as to output in black and white. That is, the original document is outputted through a single development using a toner color (K: black) alone in the printing of characters. As a result, it becomes possible for the user to obtain less expensively the original which was thus hatched to permit easier distinction.

Figure 14:
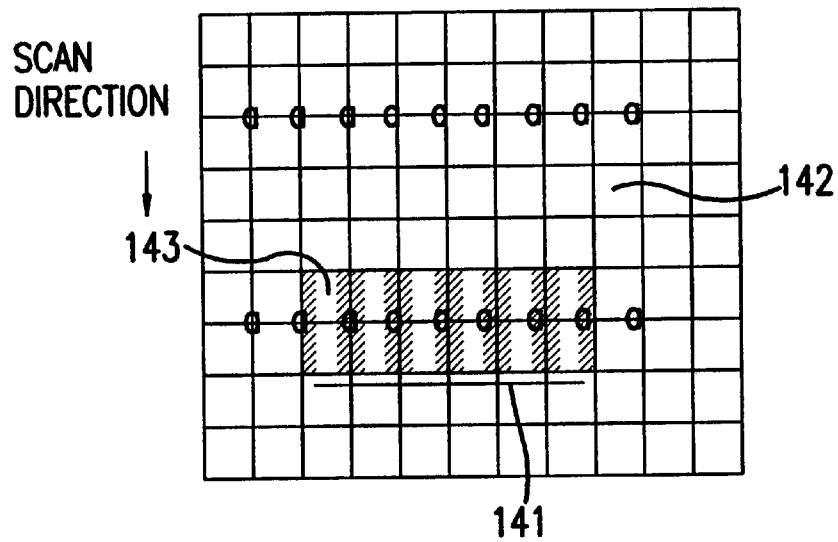
FIG. 14 is a diagram explaining discrimination of a character area marked with underline.

Although in the foregoing third embodiment there is used an enclosing line or solid paint as mark, there may be used any other graphic form if only it can visually specify the area to be covered (characters of a character string), such as parentheses or brackets or underline. For example, in the case of using underline, as shown in FIG. 14, if an underline 141 used as mark is added under a specified character string, a search is made for a white pixel area corresponding to a line spacing through the line spacing just above the underline 141. The area, indicated at 143, sandwiched in between the underline 141 and the area 142 is the area covered. In this case, the width of each of the searched area 142 and the area 14s is equal to the length of the underline 141, while the height thereof corresponds to a certain number of picture elements in each line spacing.

Figure 15:
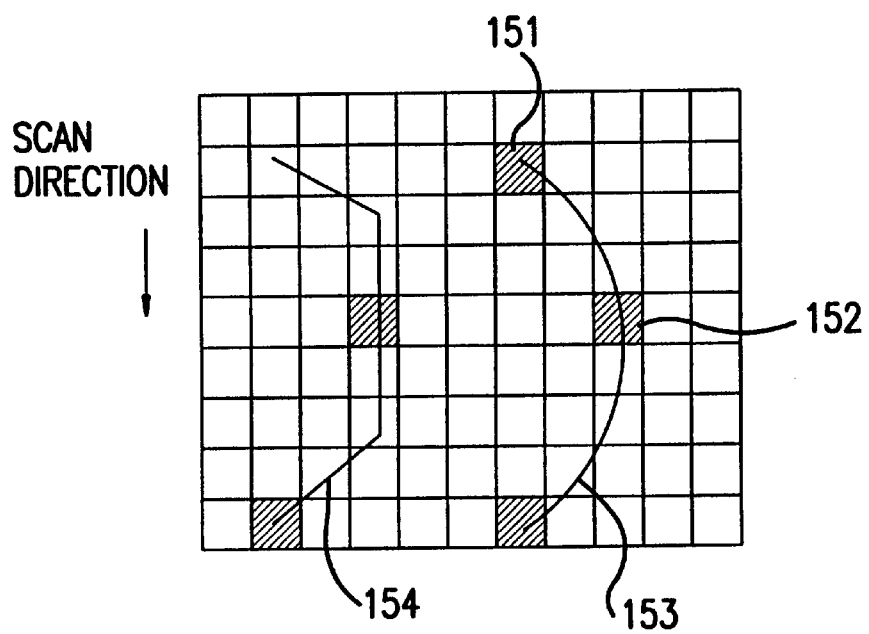
FIG. 15 is a diagram explaining discrimination of a marked area using pixel data of parenthesis or bracket.

In the case of using parentheses or brackets, as shown in FIG. 15, in which direction a parenthesis 153 or a bracket 154 faces, each being used as mark, is determined on the basis of whether end-point pixel data 151 in the parenthesis or bracket constituting pixel data and a central pixel data 152 are positioned on the right side or on the left side (with respect to the scanning direction), thereby specifying a mark range. The parenthesis and bracket 153, 154 each used as mark are right-hand ones, so by determining left-hand ones opposed thereto it is made possible to determine the character area of a character string positioned therebetween.

In the coloration conversion, the operation for altering color is performed for the pixel data which constitute characters in a marked area. In this connection, a modification may be made to alter the character shape, which modification is effected by performing a bit shift and a bit inverting operation based on logical operations for the picture elements. For example, according to this modification it is possible to attain such effects as thickening or thinning characters, making characters into pouched characters, and shading. In this case, if distinction of character strings can be made even without changing the character color, the character color may remain unchanged.

Further, in view of the large volume of data in the case of storing processing image data there may be added a system component having an image compressing function, whereby the processing image data are stored in a compressed state. This is advantageous in that not only the volume of data held by the processing image data holding section 106 can be decreased, but also the volume of data checked by the mark image detecting section and the mark area detecting section becomes smaller, thus permitting the processing to be executed more rapidly as a whole.

According to the document processor of the present invention, as set forth hereinabove, each marked character string in a black-and-white document is subjected to the coloration conversion to afford a more conspicuous color document. In this case, the mark of the colored portion is removed, or the character shape is altered, whereby the color document obtained is easier to read than a merely mark•colored document. Consequently, as compared with the prior art, each highlight portion in the color document after the coloration conversion has an expression form making the most of the coloration effect, thus permitting the user to obtain a document of a higher appealing effect. In the document processor of the present invention, moreover, as character specifying marks for character strings to be changed in color there may be used various marks according to the format or form of document data as processing objects. Besides, various character string altering methods can be defined according to colors and shapes of different types of marks. As a result, for example in a color copying machine, "which portion and in what manner is to be altered" comes to be instructed automatically by merely reading an original even without using a panel for the designation of color after conversion. Thus, the instruction for alteration can be done in a simple manner.

What is claimed is:

1. A document processor comprising:
   image information input means for inputting an electronic document described by a page description language and having a black-and-white image to be processed, the electronic document containing at least one control word that describes a black-and-white mark of the image;
   mark detecting means for detecting the at least one control word from the input electronic document;
   image portion designating means for designating a portion of the image based on the at least one detected control word;
   changing method determining means for determining a manner in which a visual characteristic of the designated portion of the image is to be altered; and
   image information generating means for generating a changed version of the electronic document by inserting at least one additional control word into the electronic document, wherein the visual characteristic of the designated portion of the image in the changed version of the electronic document is altered in accordance with the changing method determined by said changing method determining means.

2. A document processor according to claim 1, wherein said image information generating means also removes said detected at least one control word from said changed version of the electronic document.

3. A document processor according to claim 1, wherein said changing method determining means determines the changing method based upon said detected at least one control word.

4. A document processor according to claim 3, wherein said changing method determining means determines the changing method based upon a shape of the mark described by the at least one control word.

5. A document processor according to claim 1, wherein said image portion designating means calculates a layout value on a document page of the image to be processed and then compares said layout value with an area that said mark described by the at least one control word covers on the document page, to thereby designate the portion of the image.

6. A document processor according to claim 1, wherein at least either color or shape is the visual characteristic that is altered.

7. A document processor according to claim 1, wherein the alteration of the visual characteristic is made for at least either image portion forming lines or an image portion background area.

8. A document processor comprising:

image information input means for inputting an electronic document described by a page description language, the page description language describing a black-and-white image having characters described by character code information and a highlight graphic form for the characters described by highlight graphic code information;

code information detecting means for detecting a specific type of the highlight graphic code information from said electronic document input by said image information input means;

character string designating means for designating the character code information sandwiched between codes of said specific type of highlight graphic code information detected by said code information detecting means;

color determining means for selecting a color different from black as a color to which the character code information designated by the character string designating means is to be colored; and means for converting the color of the designated character code information into the color determined by said color determining means by inserting color code words into the electronic document.

9. A document processor according to claim 8, wherein said means for converting does not receive the character code information input by said image information input means that is not designated by said character string designating means.

10. A document processor according to claim 8, further including means for deleting the detected specific type of highlight graphic code information detected by said code information detecting means.

11. A document processor comprising:

image information input means for inputting an electronic document described by a page description language, the page description language describing a black-and-white image having characters described by character code information and a highlight for the characters described by graphic code information;

page layout determining means for determining a page layout of the electronic document input by said image information input means;

graphic form detecting means for detecting the position of a highlighting graphic form described by said graphic code information in the page;

character string designating means for designating a string of the character code information contained in said highlighting graphic form on the basis of both the result of the determination made by said page layout determining means and said position of the highlighting graphic form detected by said graphic form detecting means;

color determining means for selecting a color different from black as a color to which the string of character code information designated by said character string designating means is to be colored; and means for converting the color of the string of character code information designated by said character string designating means into the color determined by said color determining means by inserting color code words into the electronic document.

12. A document processor according to claim 11, wherein said means for converting does not receive the character code information input by said image information input means that is not designated by said character string designating means.

13. A document processor according to claim 11, further including [a] graphic form deleting means for deleting the graphic code information describing the highlighting graphic form detected by said graphic form detecting means.

14. A document processor comprising:

an input device that inputs an electronic document described by a page description language and having a black-and-white image to be processed, the electronic document containing character codes that describe characters in the image and mark codes that describe marks in the image;

a mark detector that detects at least one specified type of mark code in the input electronic document;

a character string designator that designates a character string in the electronic document based on the detected at least one specified type of mark code;

a visual characteristic changing circuit that determines a manner in which a visual characteristic of the designated character string is to be altered; and an image generator that generates a changed version of the electronic document by inserting at least one control word into the electronic document that alters the visual characteristic of the designated character string in accordance with the determination made by the visual characteristic changing circuit.

15. The document processor of claim 14, wherein the image generator removes the detected at least one specified type of mark code from the electronic document.

16. The document processor according to claim 15, wherein the visual characteristic changing circuit determines the changing method in accordance a the shape of the mark.

17. The document processor of claim 14, wherein the visual characteristic changing circuit determines the manner in which the visual characteristic is to be altered based on the detected at least one specified type of mark code.

18. The document processor according to claim 14, wherein at least either color or shape is the visual characteristic that is altered.

19. The document processor according to claim 14, wherein the visual characteristic of at least one of image portion forming lines or an image portion background area is altered.

* * * * *